United States Patent [19]

Dewitt et al.

[11] Patent Number: 5,598,318
[45] Date of Patent: Jan. 28, 1997

[54] PERSONAL COMPUTER WITH CONFIGURATIONAL FLEXIBILITY AND SERVICE FEATURES

[75] Inventors: John R. Dewitt; Todd A. McClurg; Jay H. Neer, all of Boca Raton; Orlando Pimienta, Miami, all of Fla.

[73] Assignee: International Business Machines Corporation, Armonk, N.Y.

[21] Appl. No.: 517,226

[22] Filed: Aug. 21, 1995

Related U.S. Application Data

[62] Division of Ser. No. 134,199, Oct. 8, 1993, Pat. No. 5,495,389.

[51] Int. Cl.$^6$ .............................. G06F 1/16; H05K 7/04; H01R 13/73
[52] U.S. Cl. ..................... 361/683; 361/725; 361/726; 361/727; 439/562; 439/564
[58] Field of Search ................................ 70/58, DIG. 30, 70/159–162; 109/67, 68; 312/244, 298, 215, 219, 311, 223.1, 223.2; 220/4.02, 254, 255; 411/182, 549, 553; 439/152–160, 544, 550, 562, 563, 564; 364/708.1; 361/680–686, 724–727

[56] References Cited

U.S. PATENT DOCUMENTS 4,736,332  4/1988  Crease .................................. 364/708.1
4,979,075  12/1990  Murphy ................................. 361/686
5,051,868  9/1991  Leverault et al. ..................... 361/685

Primary Examiner—Michael W. Phillips
Attorney, Agent, or Firm—Ronald V. Davidge

[57] ABSTRACT

A personal computer includes a frame unit and a top cover mounted to pivot upward and outward to the rear of the system, or alternately, upward to the side. One or more DASD storage devices may be mounted to extend downward from the top cover. A planar board is attached atop the lower side of the frame unit, where flexible mounting hardware allows the attachment of one of several types of planar boards. A central support structure includes a riser card plugged into a connector of the planar board, and a number of card connectors into which option cards can be plugged for electrical connection with the planar board. The central support structure also includes a bracket extending along the rear of the computer, having slots through which port connectors of the option cards can extend. The central support structure is held in engagement with the connector of the planar board by the top cover when this cover is closed. When the top cover is open, the DASD storage devices may be easily replaced, the central support structure may be unplugged from the planar board, and the planar board can be easily replaced or serviced. A front surface of the computer includes a door, which is opened by rotation outward and downward, to be slid inward, providing access for the replacement of media in the storage devices. This door and the top cover are separately lockable using a multi-function lock.

22 Claims, 17 Drawing Sheets

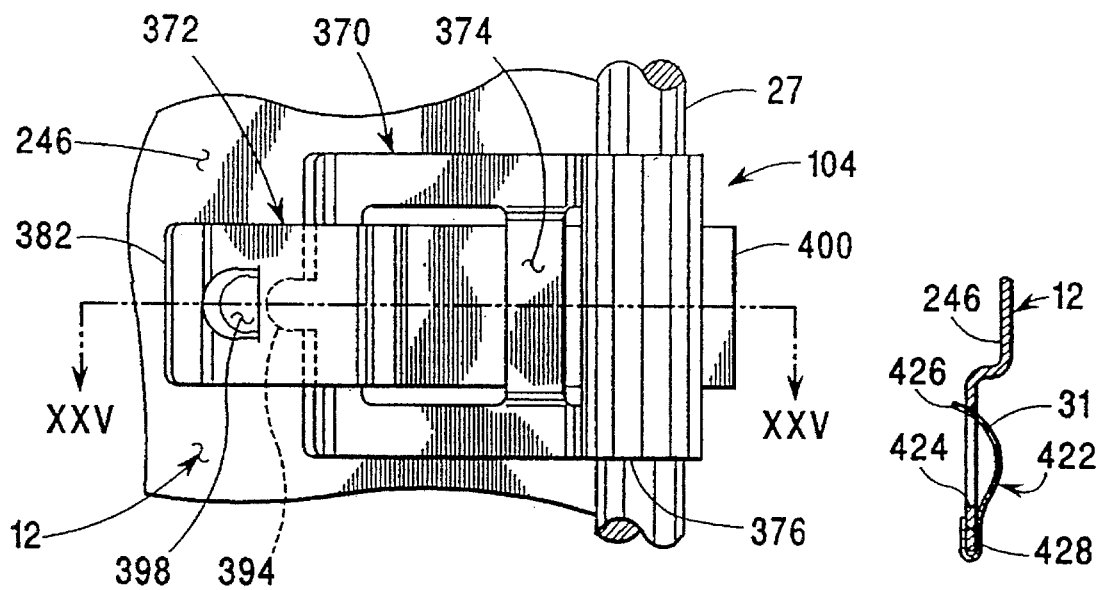
Figure 24.
Figure 28.
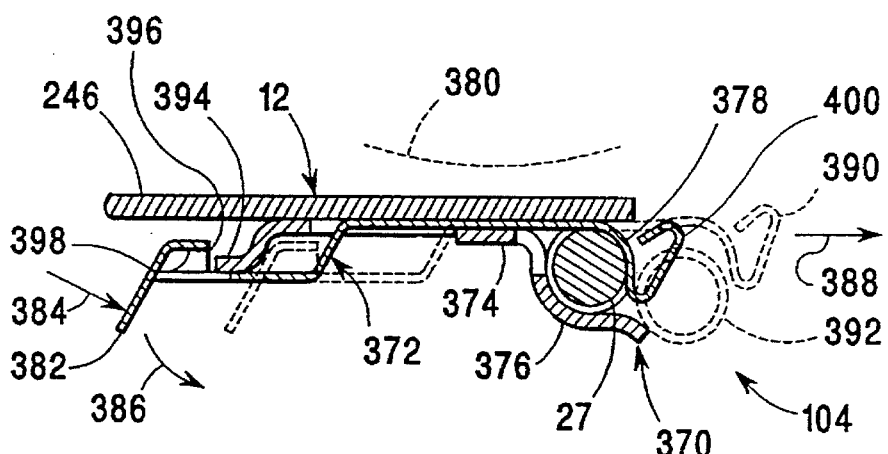
Figure 25.
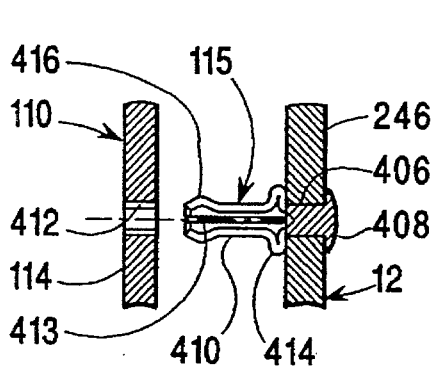
Figure 26.
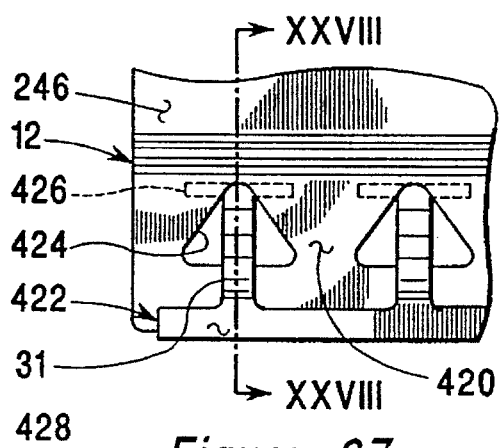
Figure 27.

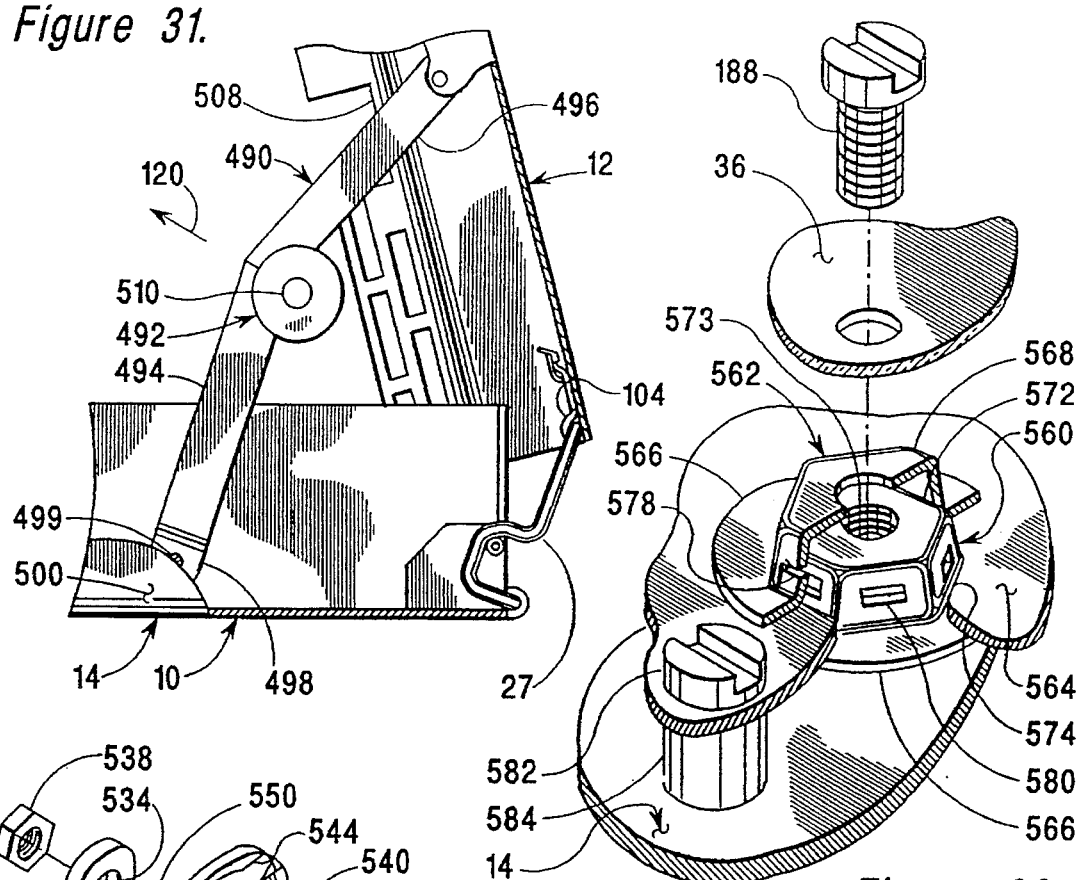
Figure 31.
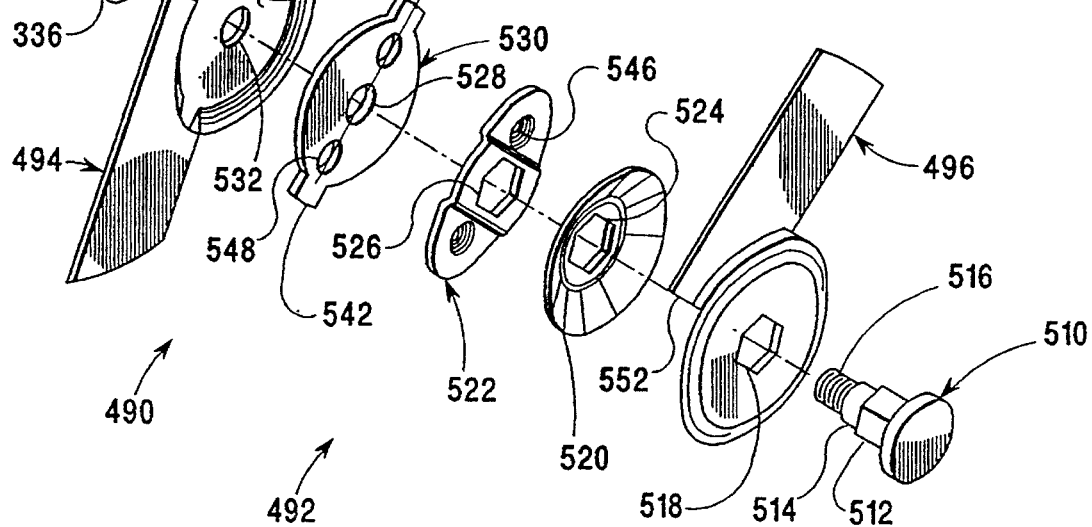
Figure 33.
Figure 32.

PERSONAL COMPUTER WITH CONFIGURATIONAL FLEXIBILITY AND SERVICE FEATURES

CROSS-REFERENCE TO A RELATED APPLICATION

This application is a division of a previous application in the U.S. Patent and Trademark Office, Ser. No. 08/134,199, filed Oct. 8, 1993 now U.S. Pat. No. 5,495,389.

BACKGROUND OF THE INVENTION

1. Field of the Invention

This invention relates to the mechanical structure of a personal computer, and more particularly, to providing several levels of access to media and components within a personal computer.

2. Background Information

Personal computer systems typically include electronic circuits mounted on a planar board, with various other circuits mounted on option, or feature, cards plugged into the planar board by means of connectors. This method allows the variation of features of the computer system by varying the option cards installed within the system. In some personal computer systems, the processor chip is also mounted on a card plugged into the planar board. In a desk-top type of system, the planar board is fastened in place to the system frame near the bottom of the system. The option cards extend upward from the planar board, being plugged directly into the planar board, or being plugged into an upward-extending riser card that is in turn plugged into the planar board. Various electromechanical devices within the system, such as diskette drives and hardfiles are typically also installed above the planar board.

A typical personal computer system also includes a number of other subassemblies installed above the planar board. Such devices may include the direct access storage devices (DASD devices) used to provide data and program storage in most personal computers. These devices include both devices with removable media, called floppy drives, and devices with fixed media, called hardfiles. A typical personal computer includes one or two such devices with removable media, each of which has a slot to which access must be available for the removal and replacement of magnetic media.

As a result of such configurations, desk-top personal computer systems must be almost completely disassembled before the planar board can be removed and replaced. This requirement causes particular difficulties because the planar board typically has the highest failure rate among system components. Particular problems are associated with the removal of option cards connected to peripheral devices, since the cables to such devices must be disconnected before the cards can be removed. Thus, much time is wasted in disassembly and reassembly of components in the event of a planar problem, which may occur during the process of building and testing the computer in a factory, or during the subsequent operation of the computer in the user's office. Furthermore, in the user's office the additional desk space, required for the placement of various components removed for access to the planar board, is often not available. What is needed is a means to provide for easy access to the planar board and to DASD components for service.

Personal computer systems are typically configured to accept a single type of planar board, with mounting holes in the planar board attached to a frame by means of screws, plastic snap fasteners, or a combination of screws and plastic snap fasteners. To reduce the emission of radio frequency interference by the system, the planar board is typically grounded through a number of paths. Conductive pads on the planar may be provided in annular spaces around mounting holes, being held against the frame by screws tightened through the holes. Conductive pads also may be provided in other locations, to be contacted by flexible spring members supported by the frame. Thus, the fixed locations of mounting features in the frame limit the system to accepting a single type of planar board. Since the characteristics of a computer system depend largely on the planar board, this limitation often means that a different frame is required for each different system.

Another problem with fixed locations for mounting the planar board arises from relatively small variations in the locations of mounting holes in the planar board and in the location of mounting features used for its attachment to the frame. Such variations, which are to be expected with any practical processes for manufacturing planar boards and system frames, sometimes make it difficult to install a planar board in a specific frame. Occasionally, such variations make it impossible to perform this installation, so that a planar board or a frame must be scrapped in the manufacturing process.

Thus, what is needed is a configurationally flexible means for mounting the planar board, including means for moving attachment points into various configurations, so that different kinds of planar boards may be accommodated. It is also desirable that the means for mounting be movable through small distances to accommodate variations in locations of features mounting a single kind of planar board.

A number of personal computers, such as the IBM Personal Computer, Model AT, are equipped with key-operated locks that can be locked to prevent the removal of the top cover, and therefore to prevent access to subassemblies within the computer system. Such locks may also function as electrical switches to prevent the unauthorized use of the computers. However, such locks tend to leave the system in either a totally locked or totally unlocked condition. For example, there is no condition in which the computer can be operated without hindrance while its internal subassemblies are protected from theft. What is needed is a flexible locking system, offering several levels of security through the use of a single lock, which may be placed in any of several positions through the use of a single key.

SUMMARY OF THE INVENTION

In accordance with one aspect of the invention, there is provided personal computer hardware including a frame section, a planar board assembly, a central support structure, a top cover, a direct access storage device, and a cover attachment mechanism. The frame section has a generally flat lower side, a front frame bezel, a rear frame opening, and an open side opposite the lower side. The planar board assembly is fastened within the frame section, by a planar board attachment mechanism, to the lower side. The planar board assembly includes a riser connector pointing toward the open side. The central support structure, which is for electrically connecting option card assemblies with the planar board, includes a riser card engaging the riser connector, a number of card connectors on the riser card electrically connected through the riser card to the riser connector, and a rear attachment framework extending within the rear frame opening. This rear attachment framework includes a number of rear slots extending through the framework, with provisions for attaching a number of card assemblies in alignment with the rear slots and in engagement with various of the card connectors. The top cover has a generally flat upper side and an open side opposite the upper side. The direct access storage device is attached to the upper side, extending below the upper side, by a storage device attachment mechanism. The cover attachment mechanism attaches the top cover to the frame section along a cover attachment edge of the top cover and along a frame attachment edge of the frame section, permitting pivoting movement of the top cover between a closed cover position and an open cover position. With the cover in the closed cover position, the central support structure is held in engagement with the riser connector. With the cover in the open cover position, the central support structure can be disengaged from the riser connector.

In accordance with another aspect of the invention, hardware is provided for controlling physical access within a computer system. This hardware includes a cover assembly, a media access door, a lock, a first locking mechanism, a cover locking mechanism, and a media door locking mechanism. The cover assembly includes a frame and a top cover, which is movable between a closed cover position and an open cover position. The lock has a rotor that can be rotated among first, second, and third lock positions, when a properly encoded key is inserted in a slot of the rotor. The lock rotor cannot be rotated between adjacent lock positions when the key is not inserted in the slot. The first locking mechanism is moved by rotation of the lock. The cover locking mechanism is moved by the first locking mechanism between a cover locking position, in which the cover is held in the closed cover position, and a cover releasing position, in which the cover is released from the closed cover position. The cover locking mechanism is in the cover locking position when the lock is in the first and second lock positions and in the cover releasing position when the lock is in the third lock position. The media door locking mechanism is moved by the first locking mechanism between a media door locking position, in which the media access door is held in the closed media door position, and a media door releasing position, in which the media access door is released from the closed media door position. The media door locking mechanism is in the media door locking position when the lock is in the first lock position, and in the media door releasing position when the lock is in the second and third lock positions.

BRIEF DESCRIPTION OF THE DRAWINGS

Preferred embodiments or versions of the subject invention are hereafter described with specific reference being made to the following Figures, in which:

FIG. 24 is a fragmentary underneath plan view of a pivot bail engaging mechanism of the computer of FIG. 1, taken as indicated by section lines XXIV—XXIV in FIG. 7;

FIG. 25 is a fragmentary right cross-sectional elevation of the pivot bail engaging mechanism of FIG. 24, taken as indicated by section lines XXV—XXV in FIG. 24;

FIG. 26 is a fragmentary, partially exploded longitudinal cross-sectional elevation of a link engaging pin of FIG. 7, taken as indicated by section lines XXVI—XXVI in FIG. 7;

FIG. 27 is a fragmentary right elevational view of the front right, lower corner portion of the top cover of the computer of FIG. 1, showing a portion of a cover grounding spring;

FIG. 28 is a fragmentary front cross-sectional elevation of the grounding spring of FIG. 27, taken as indicated by section lines XXVIII—XXVIII in FIG. 27;

FIG. 31 is a cross-sectional side elevation taken as FIG. 8, showing an alternative linkage for holding the computer of FIG. 1 in an open position by means of friction and detent forces;

FIG. 32 is an exploded isometric view of a friction and detent portion of the alternative linkage of FIG. 31;

FIG. 33 is a fragmentary, partially exploded isometric view of an alternative attachment mechanism for mounting a planar board in the computer of FIG. 1;

DETAILED DESCRIPTION

Figure 1:
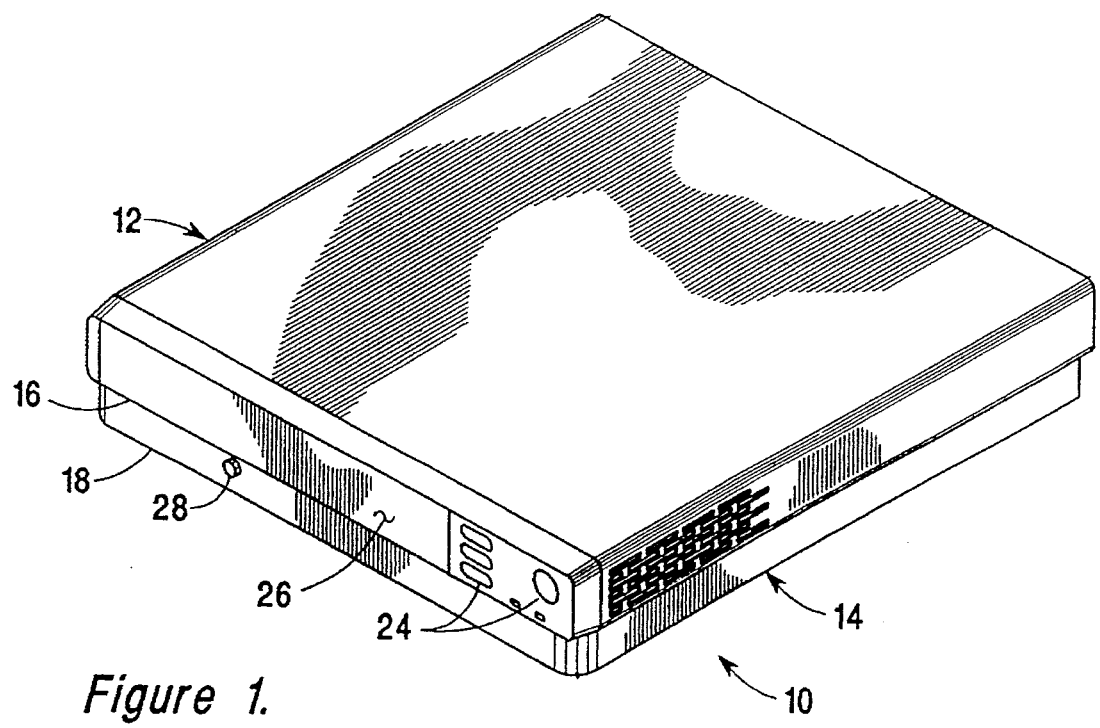
FIG. 1 is an isometric view of a personal computer built in accordance with this invention, in a closed operating position, as viewed from in front, above, and to the right.
Figure 2:
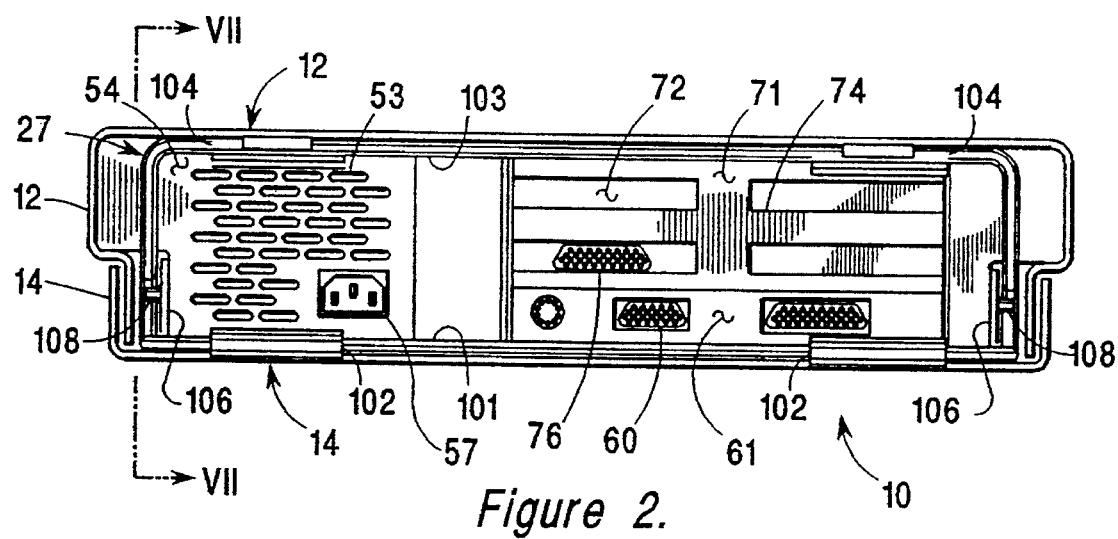
FIG. 2 is a rear elevational view of the computer of FIG. 1.
Figure 3:
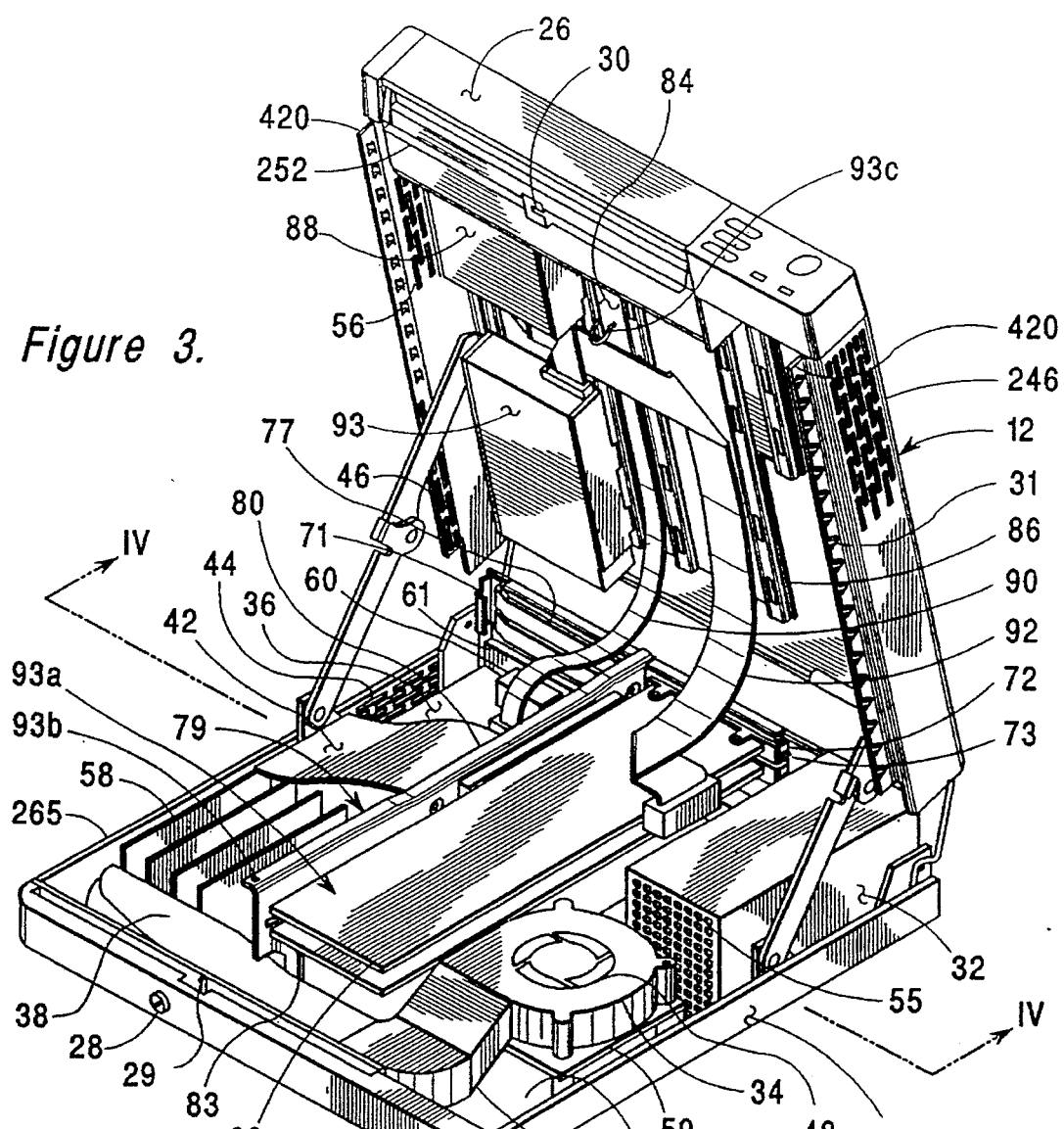
FIG. 3 is an isometric view of the computer of FIG. 1, in an open position for repair or modification, as viewed in FIG. 1.
Figure 5:
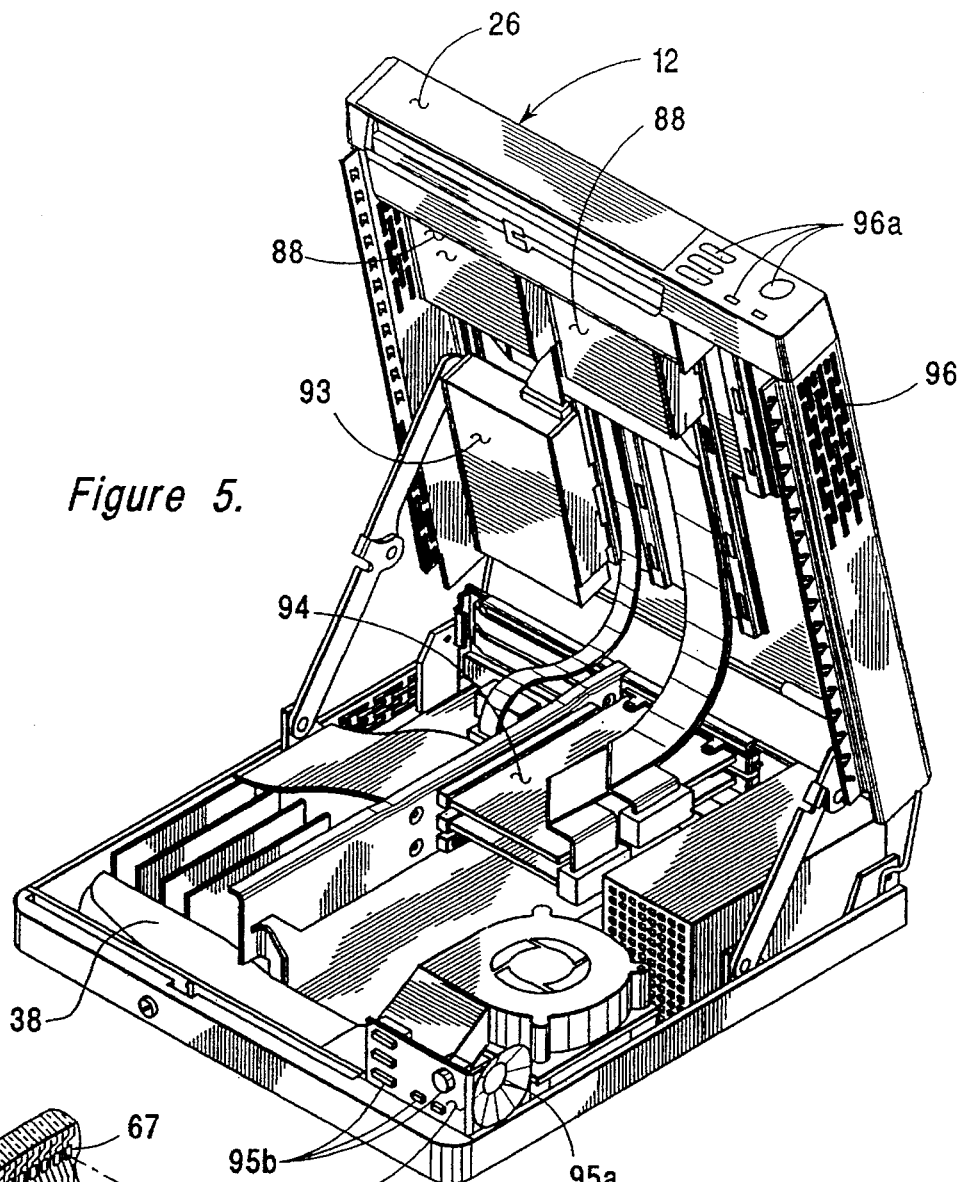
FIG. 5 is an isometric view similar to FIG. 3, showing an alternative configuration of internal components.
Figure 6:
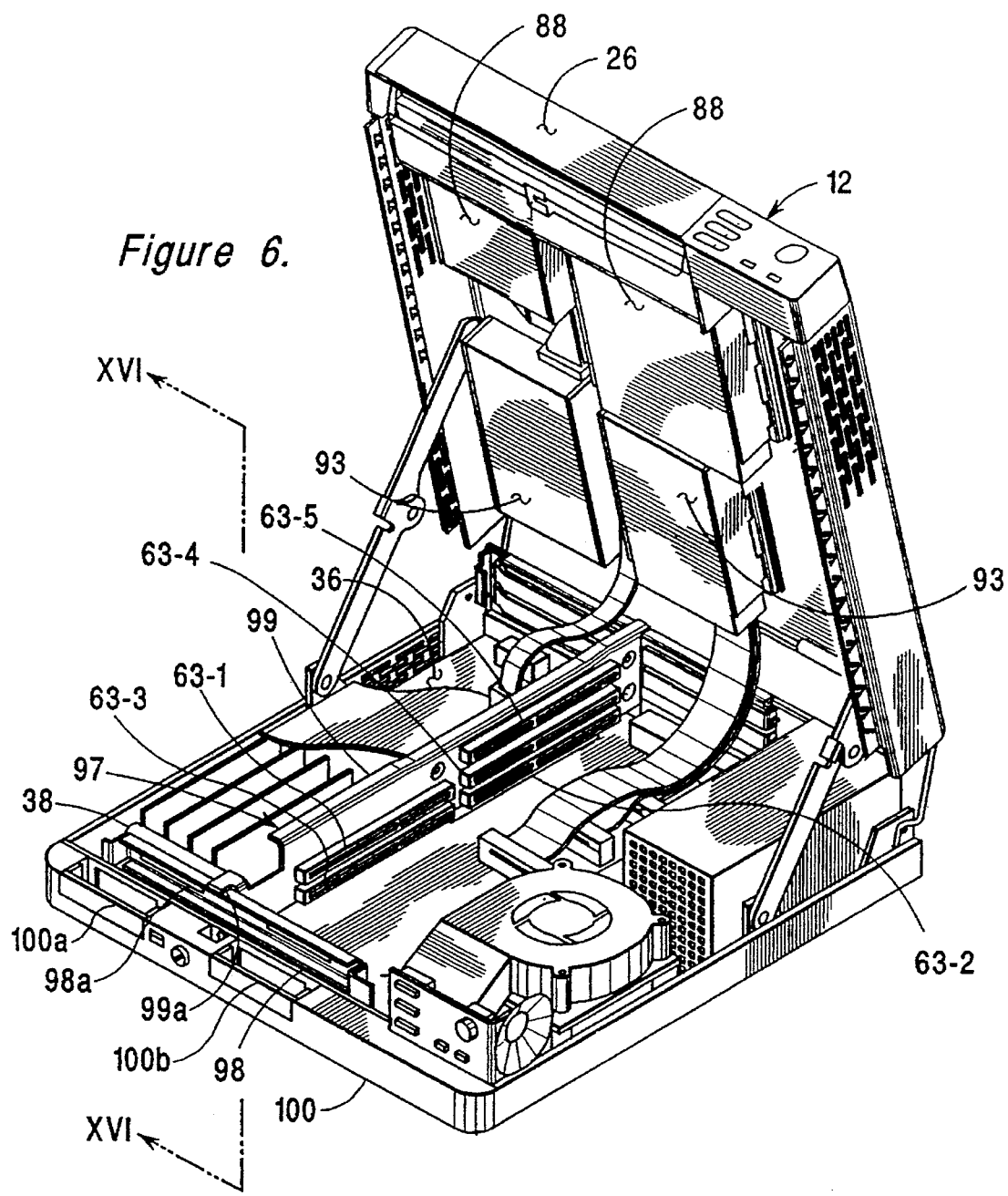
FIG. 6 is an isometric view similar to FIG. 3, showing a second alternative configuration of internal components.
Figure 29:
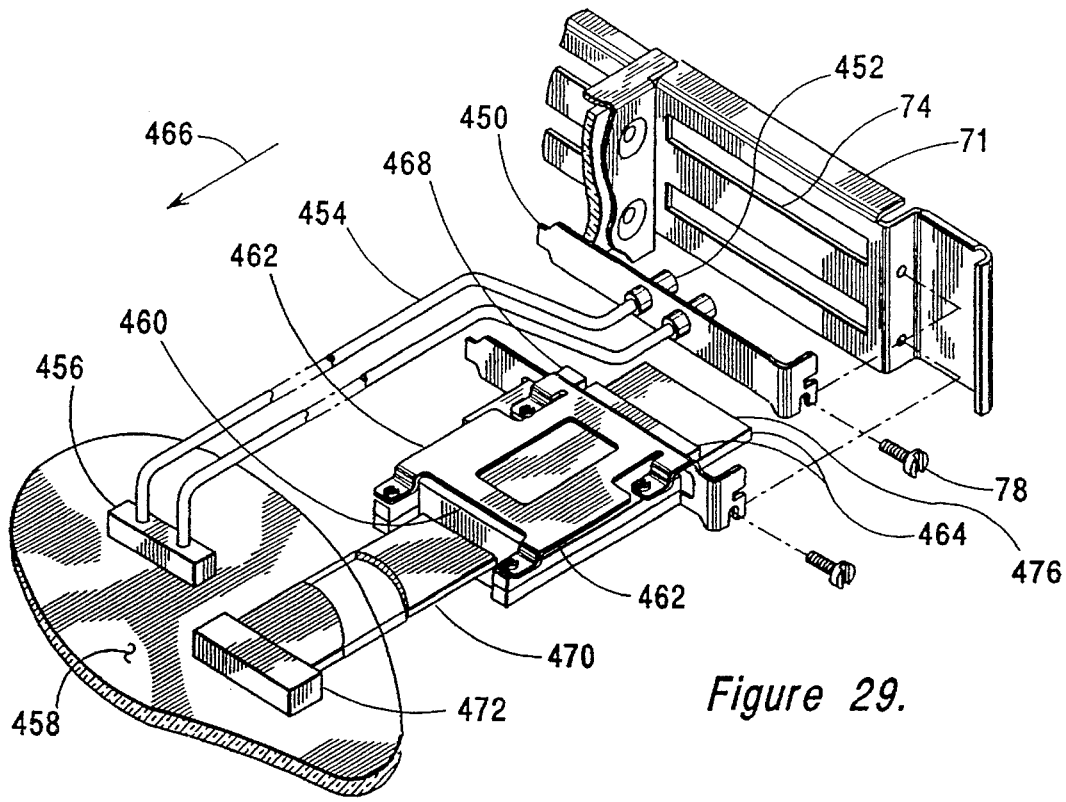
FIG. 29 is a fragmentary isometric view of a central portion of the computer of FIG. 1, showing an optional PCMCIA-type card socket and a connector mounting bracket which may be installed in the slotted bracket at the rear of the computer.
Figure 30:
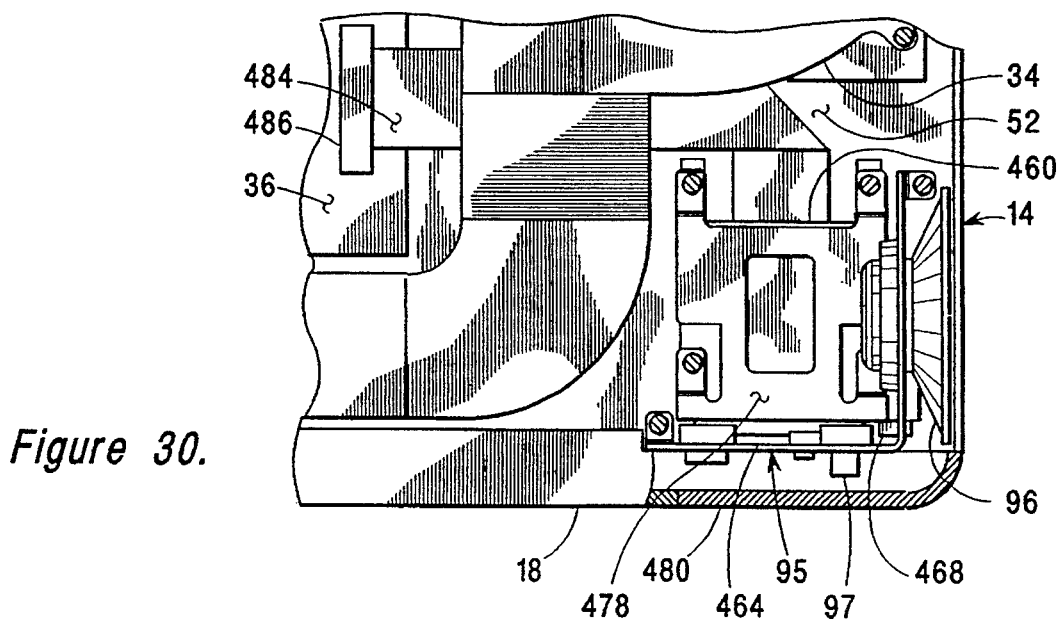
FIG. 30 is a fragmentary plan view of the front right portion of the computer of FIG. 1, showing particularly the optional installation of a PCMCIA-type card socket.
Figure 34:
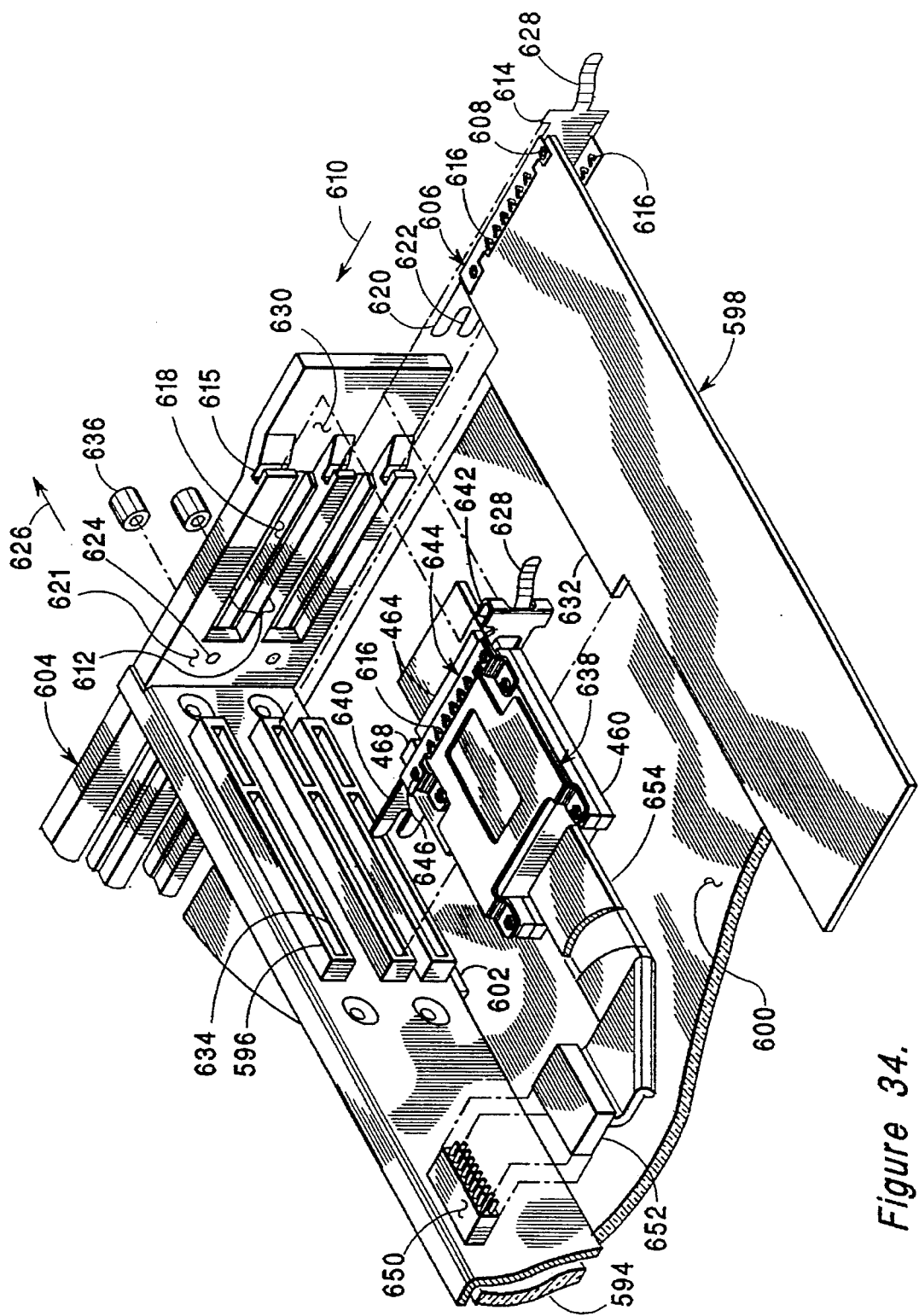
FIG. 34 is a fragmentary view of a personal computer built in accordance with this invention to provide an alternative bus interface, showing in an exploded relationship therewith, an option card assembly, and an optional PCMCIA-type card socket.
Figure 35:
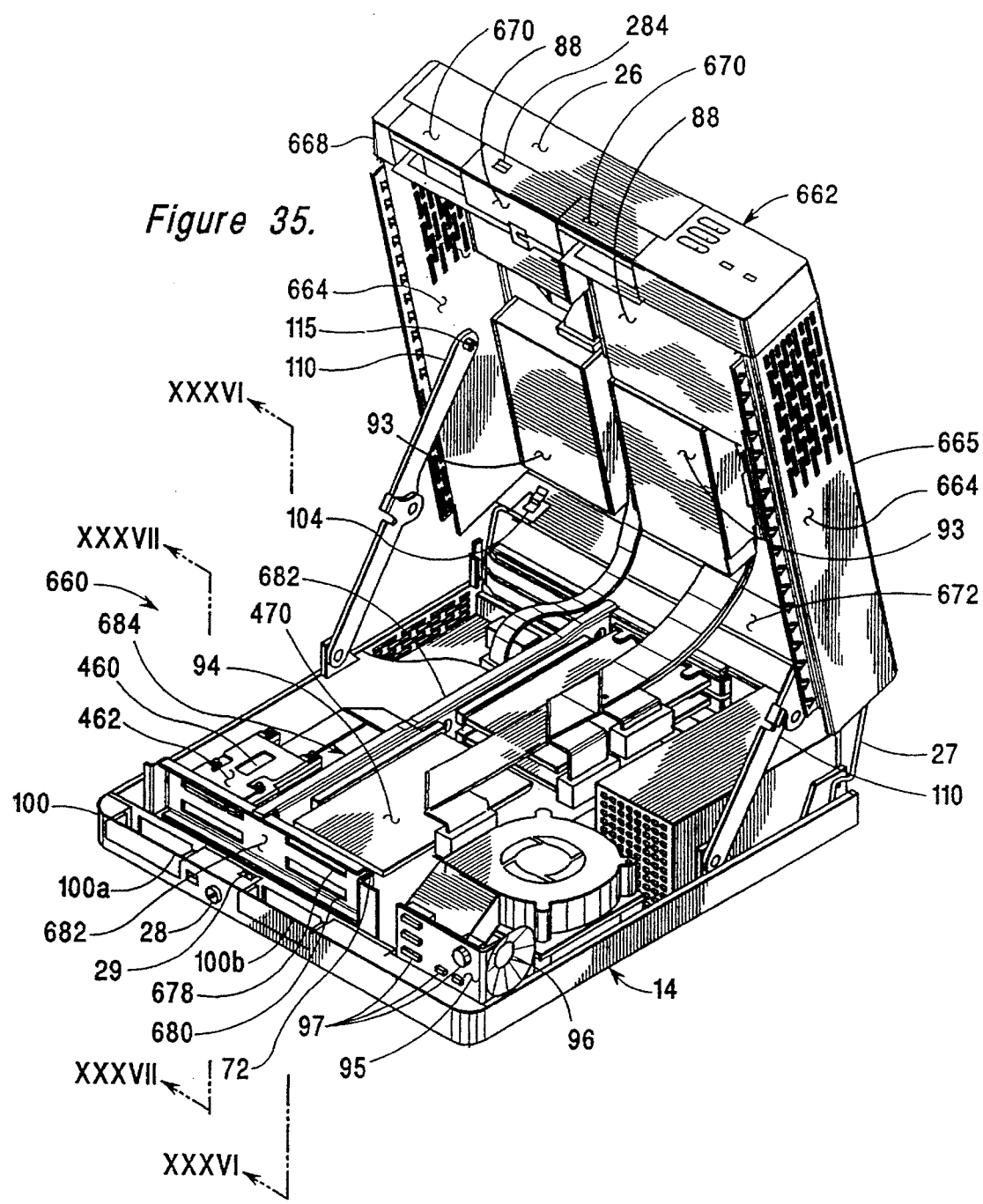
FIG. 35 is an isometric view similar to FIG. 3, showing a computer having an alternative top cover providing more space for additional capabilities.
Figure 36:
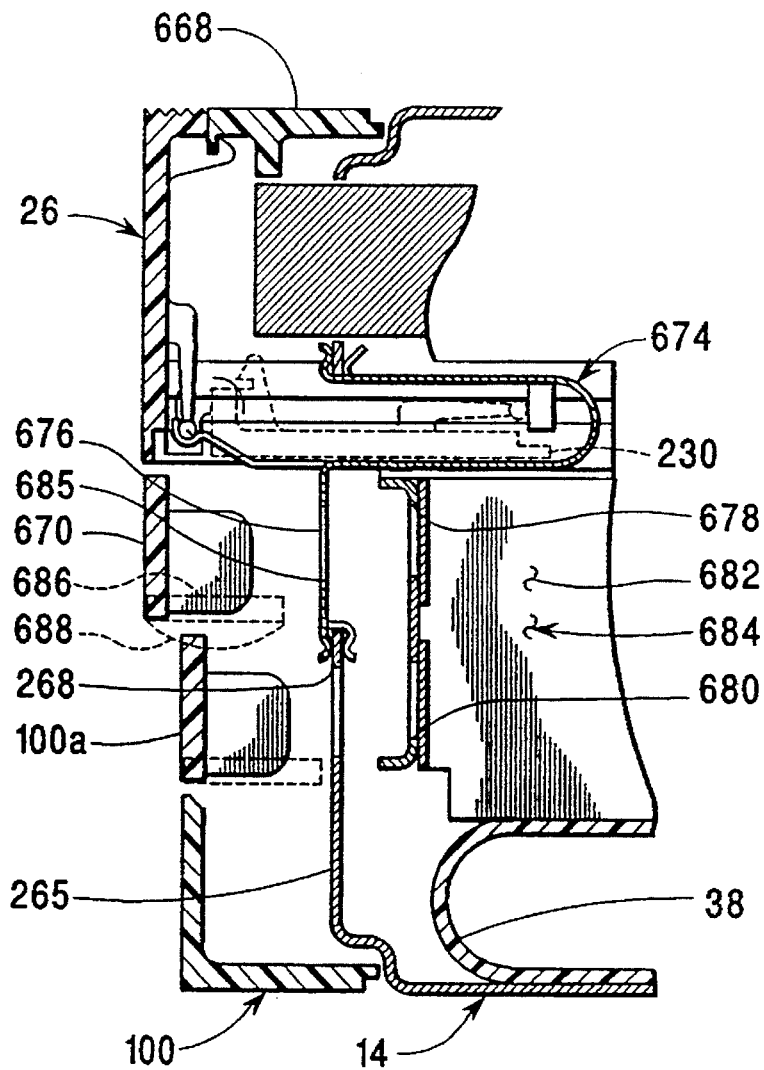
FIG. 36 is a fragmentary cross-sectional right side elevation of the computer of the computer of FIG. 35, taken as indicated by section lines XXXVI—XXXVI in FIG. 35, showing the computer in a closed, operating position.
Figure 37:
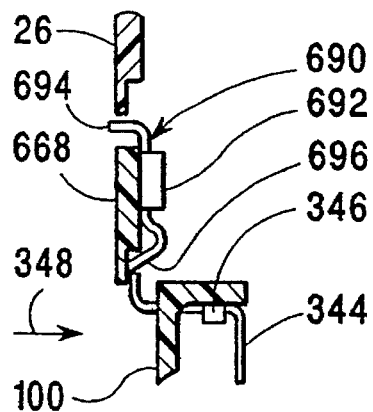
FIG. 37 is a fragmentary cross-sectional right side elevation of the media access door locking mechanism of the computer of FIG. 35, taken as indicated by section lines XXXVI—XXXVI in FIG. 35, also showing the computer in a closed, operating position.
Figure 39:
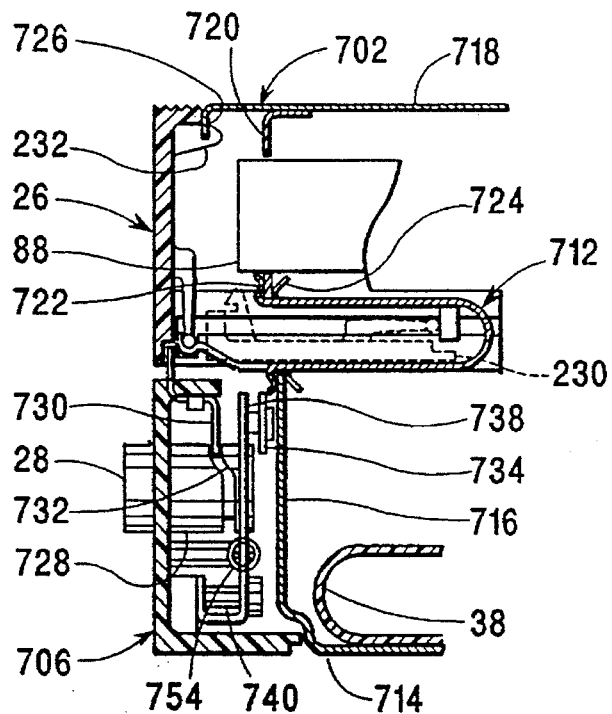
FIG. 39 is a fragmentary cross-sectional right side elevation of the computer of FIG. 38, taken as indicated by section lines XXXIX—XXXIX in FIG. 38, showing the computer in a closed, operating position.
Figure 39:
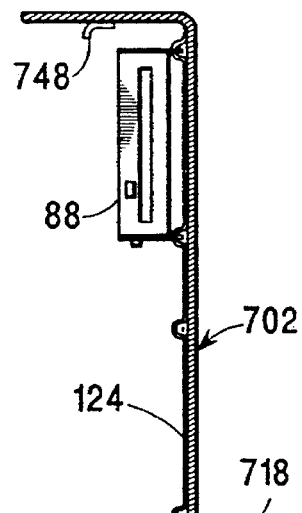
Figure 38:
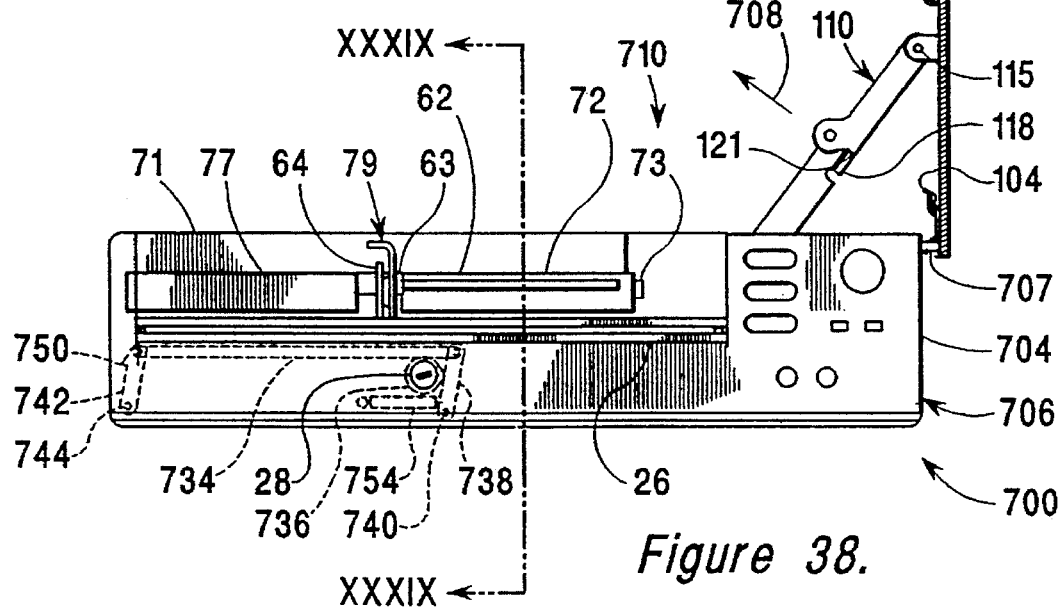
FIG. 38 is a front elevational view of an alternative version of a computer built in accordance with the present invention, having a top cover pivoted along a right edge of the frame section, showing the computer in an open position, as required for service and configurational changes.

FIGS. 1 through 15 show various aspects of a personal computer built in accordance with the present invention, with FIGS. 1 and 2 showing the computer in a closed position, as it is normally operated. FIGS. 3, 5, and 6 show different ways the computer may be configured, with the computer in an open position, in which it may be serviced or reconfigured. FIG. 4 and FIGS. 7 through 15 show various assemblies forming parts of the computer. FIGS. 29 and 30 show optional assemblies that may be added to the computer:

Alternative applications of the present invention are shown in FIGS. 31 through 35, with alternate methods for providing certain of the features of the computer being shown in FIGS. 31 through 33. FIG. 34 shows how an alternate computer may be built to provide a different system bus. FIGS. 35–37 show a larger computer built using the lower portion of the computer of FIGS. 1 through 13, together with a number of concepts of the present invention. FIGS. 38 and 39 show a personal computer built in accordance with the present invention to have a top cover which pivots open along a right side edge, instead of along a rear edge.

At various points in the specification and in the appended claims, references are made to directions, such as "upward" or "rearward." These references, which are made to simplify discussion concerning the relative locations of certain features, assume that the computer is sitting on a desk, with the frame facing down, the top cover facing up, and operational controls facing forward. These references are not intended to limit the scope of the present invention; a computer built in accordance with the present invention can be used in various orientations, as demonstrated particularly through the wall-mounting hardware described in reference to FIGS. 14 and 15.

Referring first to FIG. 1, which is an isometric view of the computer as viewed from in front, above, and to the right, personal computer 10 includes a top cover 12 and a frame 14, which together generally enclose various internal electronic circuits. Top cover 12 includes an upper front bezel 16, while frame 14 includes a lower front bezel 18. A number of controls 24 are provided for various purposes, such as turning computer 10 on and off. Since the enclosure of computer 10 may surround storage devices with removable media, such as diskette drives, a pivotable media access door 26 is provided to allow access for the insertion and removal of such media.

Referring to FIGS. 2 and 3, at the rear of computer 10, a pivoting bail 27 is pivotally mounted to top cover 12 and to frame 14. This arrangement allows both upward and rearward pivotal separation of top cover 12 and frame 14, as top cover 12 is moved from the closed position of FIG. 1 into the open position shown in FIG. 3, for repair, adjustment, or reconfiguration of internal components. Before this cover opening motion can occur, top cover 12 is released from frame 14 by rotating a lock mechanism 28, moving a cover latch 29 out of engagement with a latching slot 30. In this way, top cover 12 is released to rotate upward while remaining in connection with frame 14 by means of pivoting bail 27.

Along each side of the interface between top cover 12 and frame 14, electrical continuity is provided by means of a number of flexible contact spring segments 31, which provide multiple contact points spaced apart from one another through distances compatible with the reduction of the emission of electromagnetic energy from the computer 10. This type of contact between major shielding covers has been found to be particularly beneficial in reducing the emission of such energy, which may otherwise interfere with the transmission of communication signals.

Personal computer 10 may be assembled into a large number of configurations. As shown in FIG. 3, major components attached within frame 14 include, for example, a power supply 32, a cooling fan 34, and a planar board 36. A transverse duct 38 directs cooling air from outlet 40 of fan 34 to a space above planar board 36. A baffle 42, extending above the left portion of planar board 36 directs air from transverse duct 38, above this portion of the planar board, to outlet slots 44 in the left side of frame 14. When top cover 12 is closed, outer slots 46 are generally aligned with outlet slots 44, so that air can flow outward from the space below baffle 42. Those circuit devices most requiring cooling air may be mounted on this side of planar board 36, extending upward into this airflow. Fan 34 is a centrifugal-flow device sucking air through an inlet hole pattern 48 in its top surface and through a similar hole pattern (not shown) in its lower surface. Fan 34 is mounted on a support bracket 50 above the adjacent surface 52 of frame 14, exposing the hole pattern of the lower surface. Air is drawn into fan 34 through power supply 32, which has a number of external holes 53 in its rear surface 54 (shown in FIG. 2), allowing the inward flow of air from outside, and through a number of holes 55 allowing the flow of air between power supply 32 and fan 34. An additional inlet hole pattern 56 is provided in top cover 12 to allow the flow of additional air from outside computer 10 into fan 34.

Planar board 36 includes a number of generally necessary circuits, along with means for electrically connecting a number of optional circuits. SIMM modules 58 (single in-line memory modules) may be plugged into appropriate sockets (not shown) on planar board 36 to provide a random access memory function.

Referring to FIGS. 2 and 3, rear surface 54 of power supply 32 also includes an appliance coupler 57, into which a line cord may be plugged for connection to a standard alternating-current power source. Connectors 60 extend along a rear edge of planar board 36, through apertures in a planar shielding bracket 61, for connection to various external cables (not shown). Various of these connectors 60 are configured for connection to input devices, such as a keyboard (not shown) or mouse (not shown), while others of these connectors 60 may be configured for connection to peripheral devices (not shown), such as a display unit and a printer, or to communication cables (not shown).

Figure 4:
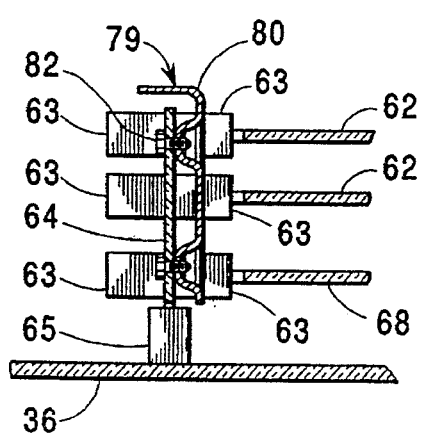
FIG. 4 is a cross-sectional elevation, taken as indicated by section lines IV—IV in FIG. 3, showing a central support structure used in the attachment of circuit cards.

Referring to the cross-sectional elevation of FIG. 4, additional, optional circuits may be provided by means of option cards 62, which are plugged into connectors 63 of a riser card 64. Riser card 64 is in turn plugged into a connector 65 of planar board 36. Thus, electrical connections are made from planar board 36 through connectors 65 and 63, and through circuit traces on riser card 64, to option cards 62. The I/O channel of the system, for example, may be connected to option cards 62 in this way.

Figure 4A:
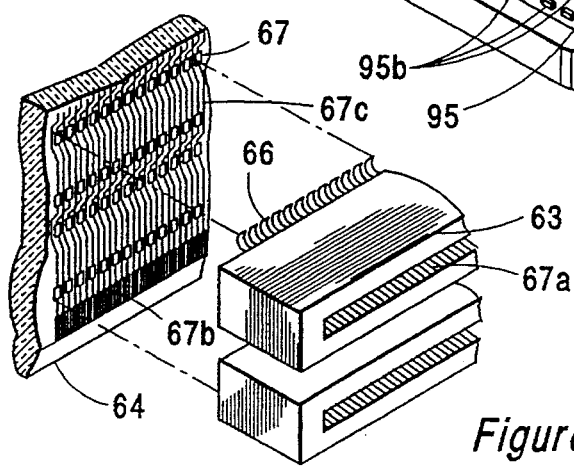
FIG. 4a is an exploded isometric view of the attachment of connectors to a riser card in the central support structure of FIG. 4.

As shown in FIG. 4a, the use of surface mount technology, in which formed terminal elements 66 extending from connectors 63 are soldered to conductive pads 67 at the surface of riser card 64, allows the placement of connectors 63 at identical locations on each side of riser card 64. Terminal elements 66 are integral portions of spring terminals 67a which extend within each connector 63 to contact conductive pads on an inserted option card 62 (shown in FIG. 4). Conductive pads 67 are electrically connected to pads 67b on the surface of riser card 64, by means of conductive traces 67c. When riser card 64 is inserted into connector 65 of planar board 36 (shown in FIG. 4), electrical connections within the connector 65 connect pads 67b to various circuits within the planar board.

Referring again to FIGS. 2 and 3, a slotted bracket 71 extends partially across the rear of computer 10, behind the region in which option cards 62 may be placed. Each option card 62 is part of an assembly including a card bracket 72, which is attached to slotted bracket 71 by means of a screw 73, closing a slot 74 in bracket 71. Some option cards also include port connectors 76 (shown in FIG. 2), which are directed outward through apertures in card brackets 72 and through slots 74, to be used for the attachment of cables to peripheral devices or for the attachment of communication cables (not shown).

Referring to FIGS. 3 and 4, limited option cards 68, which are installed in the lowest connectors 66 on riser card 64, are not directed at a corresponding slot 74 in bracket 71, and are not attached to a card bracket 72. Preferably, limited option cards 68 are used for functions, such as extended system memory, which do not require cable attachment to a peripheral device. Blank brackets 77, which are not attached to option cards 62, are used to fill those slots 74 in slotted bracket 71 which do not correspond to an installed option card 62. Like each card bracket 72, each blank bracket 77 is removably attached to slotted bracket 71 by means of a screw 73.

Referring to FIGS. 3 and 4, a "T"-shaped central support structure 79 includes slotted bracket 71 and an a riser support bracket 80, which extends forward to divide the space above planar board 36, being attached to riser card 64 by means of screws 82. These brackets 71 and 80 are attached to one another, for example, by welding. Slotted bracket 71 generally fills a gap in the rear of computer 10, between power supply 32 and the left side of the computer. With computer 10 in the open position of FIG. 3, central support structure 79 may be installed by simply plugging riser card 64 into planar board connector 65. Similarly, structure 79 may be removed by simply unplugging riser card 64 from connector 65. With computer 10 in the closed position of FIG. 1, central support structure 79 is held in place, with riser card 64 plugged into connector 65, by means of the proximity between top cover inner surface 84 and the top surfaces of brackets 71 and 80. The stability of central support structure 79 is further enhanced by contact between a downward-extending front leg 83, formed as an integral portion of riser support bracket 80, and an adjacent inner surface (not shown) of frame 14.

Top cover 12 includes slotted channels 86, which may be used to mount a number of DASD devices 88 in such a way that these devices are moved upward and rearward, providing access to option cards 62, to planar board 36, and to the devices 88 themselves by moving top cover 12 into the open position shown in FIG. 3. The acronym "DASD," for direct access storage device, is used to reflect the type of magnetic storage device used in most personal computers. A DASD device, such as a magnetic disk device (floppy or hardfile), provides direct access to data instead of requiring that data be read from the beginning of a data record, such as data stored sequentially on a magnetic tape. DASD devices 88 may be attached to circuits mounted to frame 14 by means of flexible cables, such as cable 90, which are plugged into connectors atop planar board 36. Certain DASD devices may alternately be connected to various circuit cards 62, by means of flexible cables 92. In either case, the cables are routed near the rear of computer 10, where pivoting motion occurs with pivot bail 27, so that the cables are unfolded as computer 10 is opened and refolded as computer 10 is closed.

The configuration shown in FIG. 3 includes one DASD device 88, directly behind media access door 26, and another DASD device 93 in a location away from door 26. Thus, DASD device 88 preferably uses removable media, such as diskettes, while DASD device 93 preferably includes fixed media, being, for example, a hardfile.

The spaces above planar board 36 may be used for option cards 62 extending from central support structure 79, and/or for DASD devices 88 extending downward from top cover 12. In the example of FIG. 3, two full-length option cards 62 are be installed above the right side of planar board 36. SIMM memory modules 58 and baffle 42 lie below DASD devices 88 with top cover 12 closed, so these elements can be present even with upwardly adjacent DASD devices 88. Thus, a flexible use of space within computer 10 is provided by the means for attachment of DASD devices 88 and option cards 62.

In order to service a personal computer, it is necessary to obtain access to various subassemblies for repair or replacement. This type of access is also necessary for making configurational changes, such as adding circuits to perform additional functions. Access to the internal hardware of personal computer 18 is easily obtained by opening top cover 12 after lock 28 is rotated to disengage latch 29 from slot 30. A central electronic assembly 93a, consisting of central support structure 73 and of option cards, such as cards 62, and other devices attached to this structure 73, is then removed by lifting straight upward, so that riser card 64 is unplugged from planar board connector 65. To provide access to planar board 36, central electronic assembly 93a may then be hung, by means of a hole 93b in riser support bracket 80, on a hook 93c provided in top cover 12 for this purpose. At this point, planar board 36, being completely exposed from above, can be easily removed for service or replacement.

As shown in FIG. 2, many option cards 62 include external connectors 76 extending outward through slots 74 in slotted bracket 71. In accordance with the typical usage of a personal computer, these connectors 76 are variously connected by means of cables (not shown) to peripheral devices (also not shown). Referring again to FIG. 3, when central electronic assembly 93a is hung on hook 93c, the cables extending from external connectors 76 can extend through the opening at the rear of computer 10 between cover 12 and frame 14. Thus, it is unnecessary to unplug the cables attached to external connectors 76 to obtain access to planar board 36 or to other internal components.

In this way, the application of the present invention offers a significant number of serviceability advantages compared to computers of the background art. In a typical computer of the background art, various DASD devices fastened in place above the planar board must be removed before access to the planar board can be obtained. On the other hand, in personal computer 10, DASD devices 88 and 93 are moved out of the way as top cover 12 is opened. In a typical personal computer of the background art, various option cards are individually attached within a framework, either to the planar board by means of a number of connectors on the planar board, or to a riser card in turn connected to the planar board. In either of these cases, any external cables to peripheral devices must be disconnected, and each option card must be disconnected, both from its electrical connection through a connector and from its mechanical connection with the framework, to be removed completely from the computer system, before access can be obtained to the planar board. On the other hand, in personal computer 10, the option cards 62 form part of central electronic assembly 93a, which can be removed intact by disconnection from the single planar board connector 65 for access to the planar board. In personal computer 10, this operation does not require the disconnection of individual option cards 62, or the disconnection of cables to external peripheral devices. Ease of access to planar board 36 is particularly important, since the planar board of a personal computer is typically the component having the highest failure rate, and hence the most frequent need for service.

Many of these advantages of the present invention are also evident during the manufacturing process, where planar boards also tend to experience relatively high failure rates. During the manufacturing process, it is often necessary to repair or replace a planar board to fix a problem found during system testing. The ease of access to the planar and to other internal components with the present invention provides substantial time and cost savings during the manufacturing process.

The configuration of central electronic assembly 93a also affords significant advantages relative to minimizing the overall size of personal computer 10 and relative to the servicing and reconfiguration of option cards 62. In computer systems of the background art, the framework for mounting individual option cards is provided by the framework of the computer system. Thus, in computer systems of the background art, physical access to both mechanical and electrical attachments must be obtained with the card installed within the system. On the other hand, in personal computer 10, the framework for mounting individual option cards 62 is provided by central support structure 79, which is removed as a part of central electronics assembly 93a. Physical access to mechanical and electrical attachments is afforded with this assembly 93a removed from its connection with planar board 36. In this example, mechanical connection is provided by fastening card bracket 72 to slotted bracket 71 with a screw 73. Thus, since access to screw 73 with a screwdriver is provided with central electronics assembly 93a removed, it is not necessary to allow clearance for the operation of screwdriver on each side of slotted bracket 71. Specifically, screwdriver clearance space is not required between slotted bracket 71 and power supply 32. Furthermore, since individual option cards 62 are removed and installed with central electronics assembly 93a removed, it is never necessary to remove one option card 62 to achieve access to the space for another card 62.

Referring to FIG. 5, an alternative allocation of space above planar board 36 is provided through the use of a short option card 94 in an uppermost position provided by "T"-shaped central support structure 79, in place of a full-length option cards 62. When a short option card 94 is installed in this way, space is provided in front of the option card for the installation of a second DASD device 88 in a front space adjacent to media access door 26. In the closed position, the second DASD device 88 is brought into a space above the front right portion of planar board 36, in front of the short option cards 94. This configuration thus offers two DASD devices 88 directly behind media access door 26; each of these devices 88 can employ removable media. A single DASD device 93, which may be, for example, a hard file, is located away from door 26. The popular system configuration including a 3½-inch diskette drive, a 5¼-inch diskette drive, and a hardfile can be built in this way. Thus, the present invention easily provides for the alternative use of the same space for option cards or for DASD devices.

FIG. 5 also shows a bracket assembly 95 holding a speaker 95a and various switches and indicators 95b in locations adjacent to corresponding features of top cover 12 in its closed position. Thus, a pattern of holes 96 in top cover 12 is brought into place adjacent to speaker 95a, while pushbuttons and apertures 96a are adjacent to switches and indicators 95b. This bracket assembly 95 is equally applicable to the configuration shown in FIG. 3; it has been omitted from FIG. 3 only to reveal the features which would otherwise be hidden.

Referring to FIG. 6, an "H"-shaped central support structure 97 may be used in place of the "T"-shaped central support structure 79 previously discussed in reference to FIGS. 3 and 4. Support structure 97 is particularly designed to take advantage of the space savings made available through the use of short option cards 94 (shown in FIG. 5). Thus, support structure 97 includes five connectors 63 on each side, each of which is connected to the system bus through a riser card (not shown). In FIG. 6, these connectors 63 are individually indicated as connectors 63-1 through 63-5. Support structure 97 includes a front slotted bracket 98 having a slot 98a on each side, aligned with an adjacent connector 63-1 in such a way that the bracket of a short option card 94 installed in this connector 63-1 extends across the corresponding slot 98a. The configuration of front slotted bracket 98 corresponds to that of rear slotted bracket 71 in such a way that each card bracket 72 and each blank bracket 77 can be fastened to front slotted bracket 98 in the manner used for attachment to rear slotted bracket 71. Slotted bracket 98 extends atop transverse duct 38, being fastened, for example by welding, to a central support member 99 at a tab 99a. Thus, the concept of a central electronics assembly is implemented either with a central support structure 79 having a single end at which card brackets 72 may be attached, or with a central support structure 97 having two opposite ends at which card brackets 72 may be attached.

In many applications, it is necessary to obtain access to slots 98a from outside system 10. For example, a short option card 94 (shown in FIG. 5) may be connected to an external peripheral device by means of a cable from a connector extending through a card bracket 72 of the short option card 94. To obtain such access, an alternate lower bezel 100, which includes a pair of rotatable lower access doors 100a and 100b, is used in place of lower bezel 100.

Central support structure 97 provides on each side a lower position in which a single long card without a bracket 72 may be placed in a connector 63-2, or in which two short cards without brackets 72 may be placed, using connectors 63-2 and 63-3. In a central position, a single long card 62 with a bracket 72 may be placed in a connector 63-4, or two short cards 94 with brackets 72 may be placed, using connectors 63-4 and 63-1. In an upper position, using connector 63-5, a single short card 94 with a bracket 72 may be placed, or a single long card 62 with a bracket 72 may be placed. However, if a long card 62 is placed in the upper position, no DASD device may be placed above it. If a short card 94 is placed in the upper position, a single DASD device 88 may be installed on the corresponding side toward the front (as shown in FIG. 5).

As further. Shown in FIG. 6, a total of four DASD devices—two DASD devices 88, which are located near door 26 for media access, and two DASD devices 93, which are preferably devices with fixed media—may be installed to extend downward from top cover 12 if no option card 62 or 94 is installed in connector 63-1. A configuration of the general type shown in FIG. 6 may be used as an expansion box to provide additional data storage capability to a personal computer system. In such an application, the expansion box functions as a peripheral unit attached to a base system. A planar board having the circuit functions typically associated with such an circuit board may not be required. A different sort of planar board, having various connectivity features with limited logical functions may be provided instead.

General configurational features of the present invention have been discussed above with reference to FIGS. 1 through 6. More specific hardware features, variously applied in the implementation of these general features, will now be discussed with references being made to FIGS. 7 through 28.

Figure 7:
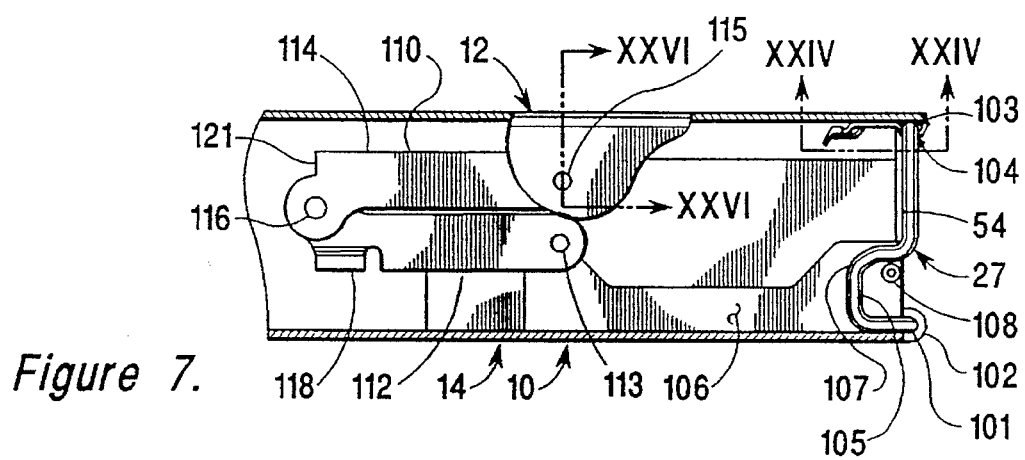
FIG. 7 is a cross-sectional side elevation of a pivoting attachment mechanism of the computer of FIG. 1, in a closed operating position, taken as indicated by section lines VII—VII in FIG. 2.
Figure 8:
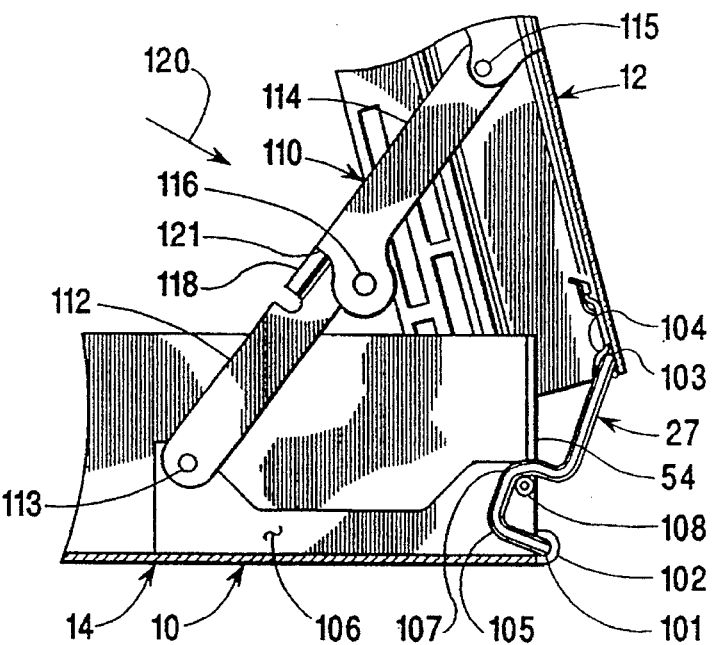
FIG. 8 is a cross-sectional side elevation similar to FIG. 7, except that the computer is shown in an open position for repair or modification.

The pivoting arrangement joining top cover 12 with frame 14 will first be discussed in greater detail, with reference being made to FIGS. 2, 7 and 8. FIG. 2 is a rear elevational view of computer 10. FIGS. 7 and 8 are cross-sectional elevational views taken as indicated by lines VII—VII in FIG. 2, with FIG. 7 showing the computer in a closed position, while FIG. 8 shows the computer in an open position.

Referring to FIG. 2, pivot bail 27 is a formed and welded rod structure extending generally around an inner periphery formed by the rear edges of frame 14 and top cover 12. A lower rod portion of 101 of bail 27 is pivotally mounted to frame 14 by means of rolled hinge tabs 102 extending from frame 14. In turn, top cover 12 is pivotally mounted on an upper rod portion 103 of bail 27 by means of hinge couplings 104 extending from top cover 12.

As shown in FIG. 7, when personal computer 10 is in its closed position, upper rod portion 103 is held adjacent to rear surface 54 of power supply 32, by the engagement of cover latch 29 in slot 30 (shown in FIG. 3), which prevents the rearward motion of top cover 12.

As shown in FIG. 8, when personal computer 10 is in its open position, upper rod portion 103 is piovted to the rear, away from power supply rear surface 54, with lower rod portion 101 turning in rolled hinge tabs 102. Bail 27 includes, at each end, a "U"-shaped inward-extending portion 105 adjacent to a bail support bracket 106 extending upward from frame 14. Each bracket 106 includes a formed tenon 108 extending into the adjacent inward-extending portion 105. As bail 27 is pivoted rearward, a corner 107 of inward-extending portion 105 on each side engages tenon 108, spreading portion 105 slightly, so that bail 27 is held in its fully rearward position by frictional forces.

Top cover 12 is also rotated upward, with hinge couplings 104 turning on upper rod portion 103. On each side, a travel limiting linkage 110 is provided to control the angle through which top cover 12 is rotated and to hold cover 12 in its open position. This linkage 110 includes a lower link 112 pivotally mounted to frame 14 by means of a pivot 113 attached to support bracket 106, and an upper link 114 pivotally mounted to top cover 12 by means of a pivot 115. Links 112 and 114 are also pivotally mounted to one another at a central pivot 116. A tab 118 from lower link 112 restricts the motion of pivot 116 in the direction of arrow 120 after linkage 110 is fully opened, by closing against a stopping surface 121 of upper link 114, as shown in FIG. 8. Links 112 and 114 are configured so that, when linkage 110 is fully opened, central pivot 116 is located in the direction of arrow 120 from a line between pivots 113 and 115. When top cover 12 is fully opened, linkage 110 is straightened as shown in FIG. 8. With linkage 110 straightened in this way, a force tending to close cover 12 results in the generation of a torque tending to move pivot 116 in the direction of arrow 120. However, since such motion is impossible, the linkage serves to hold cover 12 fully open. Thus, top cover 12 cannot be closed until central pivots 116 on each side are manually moved the direction opposite arrow 120 to release the cover 12.

Referring again to FIG. 3, as top cover 12 is moved upward and to the rear, clearing the space above planar board 36, allowing central support structure 79 to be unplugged and removed or replaced, and allowing access to planar board mounting screws at any location within the boundaries of planar board 36.

Figure 9:
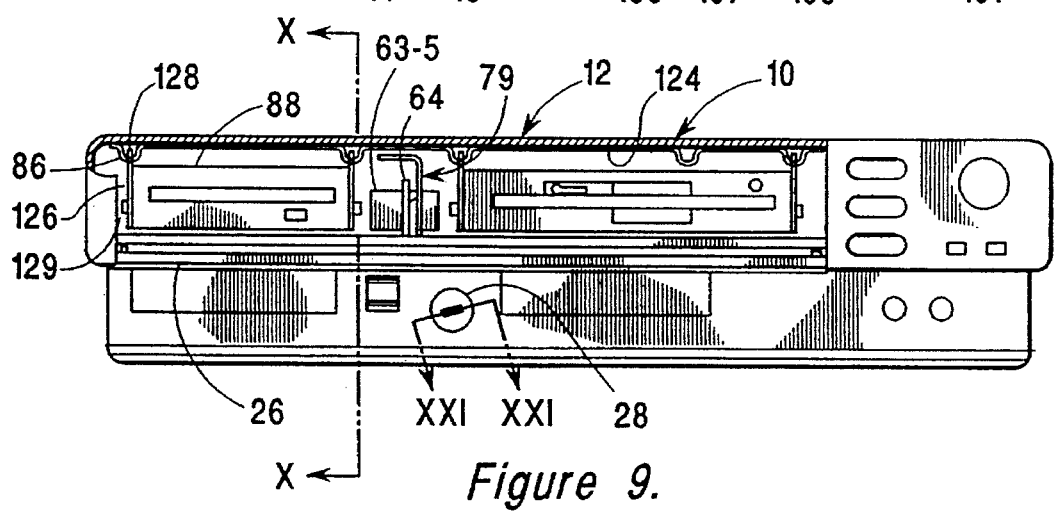
FIG. 9 is a front elevational view of the top cover of the computer of FIG. 6, shown with a media access door open to reveal the mounting of DASD devices.
Figure 10:
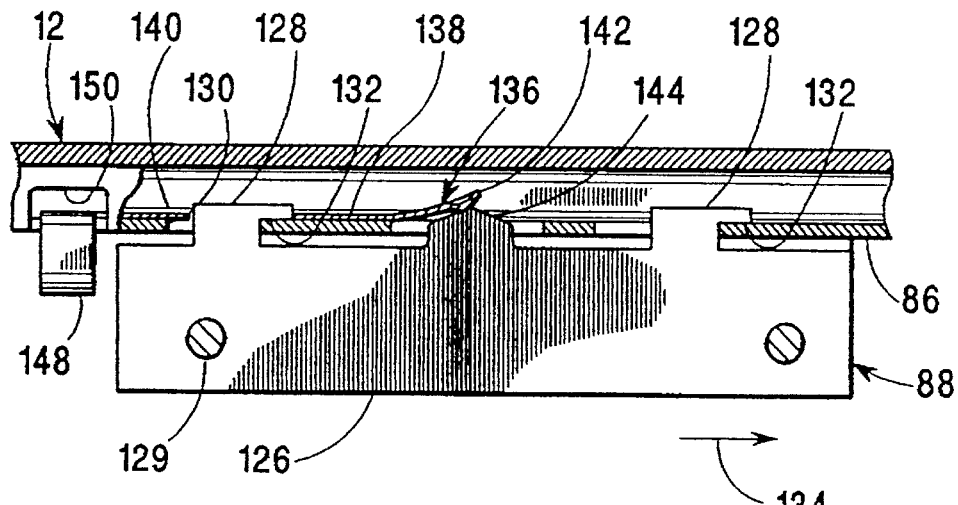
FIG. 10 is a partial cross-sectional side elevation of the top cover of FIG. 9, taken as indicated by section lines X—X in FIG. 9.

The method for mounting DASD devices 88 within top cover 12 will now be discussed in greater detail, with particular reference being made to FIGS. 9 and 10. FIG. 9 is a front view of personal computer 10, with media access door 26 shown in a lowered (open) position, stored under the front portion of DASD devices 88. Also, in FIG. 9 a portion of cover 12 is cut away to reveal the mounting of devices 88. FIG. 10 is a partial cross-sectional side view of top cover 12, taken in the direction indicated by section lines X—X in FIG. 9.

Referring to FIGS. 9 and 10, a device mounting bracket 124, including a number of slotted channels 86, is attached by welding inside top cover 12. Each DASD device 88 is attached to bracket 124 by means of a pair of sideplates 126 with tabs 128 extending upward into the slots 130 of channels 86. These sideplates 126 are mounted to the DASD devices, for example, by means of screws 129. Two channels 86 form mounting surfaces above the leftmost position, in which a DASD device 88 is installed, while three channels 86 form mounting surfaces above the rightmost position, in which a wider DASD device 131 is installed. Thus, the leftmost position is configured for mounting 3½-inch DASD devices, while the rightmost position is configured for mounting either 3½-inch or 5¼-inch DASD devices.

FIG. 9 also shows some of the spatial relationships among top cover 12, central support structure 79, and DASD devices 88. Central support structure 79, including the uppermost option card connectors 63-5, fits between installed DASD devices 88. This is why as many as four DASD devices may be installed if no cards are installed in uppermost connectors 63-5, as in the configuration of FIG. 6. However, if an option card is installed in one of the uppermost connectors 63-5, a DASD device cannot be installed in an adjacent position. Thus, the configuration of FIG. 3 has a daughter card in uppermost connector on the right side of central support structure 79, but not on the left side of this structure 79, with DASD devices 88 and 93 installed on the left side of this structure 79.

Central support structure 79 extends upward into close proximity with an adjacent underside of top cover 12. This proximity holds the riser card 64 of structure 79 in engagement with central connector 65 of the planar board 36 (shown in FIG. 4), as long as top cover 12 remains in a closed position. When cover 12 is opened, central support structure 79 can be easily disengaged from central connector 65 for system servicing or for configurational changes.

As shown in FIG. 10, each DASD device 88 or 93 is installed by moving the device upward and to the rear, in the direction of arrow 134. After installation, each tab 128 of sideplate 126 extends upward into a channel 86 through a slot 130. A notch 132 of each tab 128 holds the associated DASD device 88 or 93 in place by engagement with an adjacent end of a slot 130. A latching mechanism, including a flexible cantilever spring 136 welded inside channel 86 at an attachment region 138, is provided to retain device 88 or 93 by preventing forward motion after installation. Cantilever spring 136 includes a latching tip 140, which extends partially across an adjacent slot 130. As the corresponding tab 128 is inserted into this slot 130, the latching tip 140 is deflected upward. As tab 128 is subsequently moved rearward in the direction of arrow 134, latching tip 140 is cleared to return downward, into its undeflected position, blocking subsequent forward motion in the direction opposite arrow 134. Cantilever spring 136 also includes a force-loading tip 142, which applies a downward force on an upstanding cam portion 144 of sideplate 126, which is thereby held downward, with the surfaces of notches 132 resting against the internal surfaces 146 of channels 86. In this way, clearance distances between adjacent surfaces are avoided. Such clearance distances could otherwise cause rattling and shock loads, which could damage DASD devices, during the transport of computer 10.

Cantilever spring 136 also includes a tab 148 extending outward through a slot 150 in channel 86. The DASD unit, such as DASD unit 88, attached to sideplate 126 may be removed as tab 148 is held upward, deflecting spring 136 until latching tip 140 is deflected upward past the adjacent tab 128. The DASD unit may then moved forward, in the direction opposite arrow 134, and downward to be disengaged from channel 86.

Figure 11:
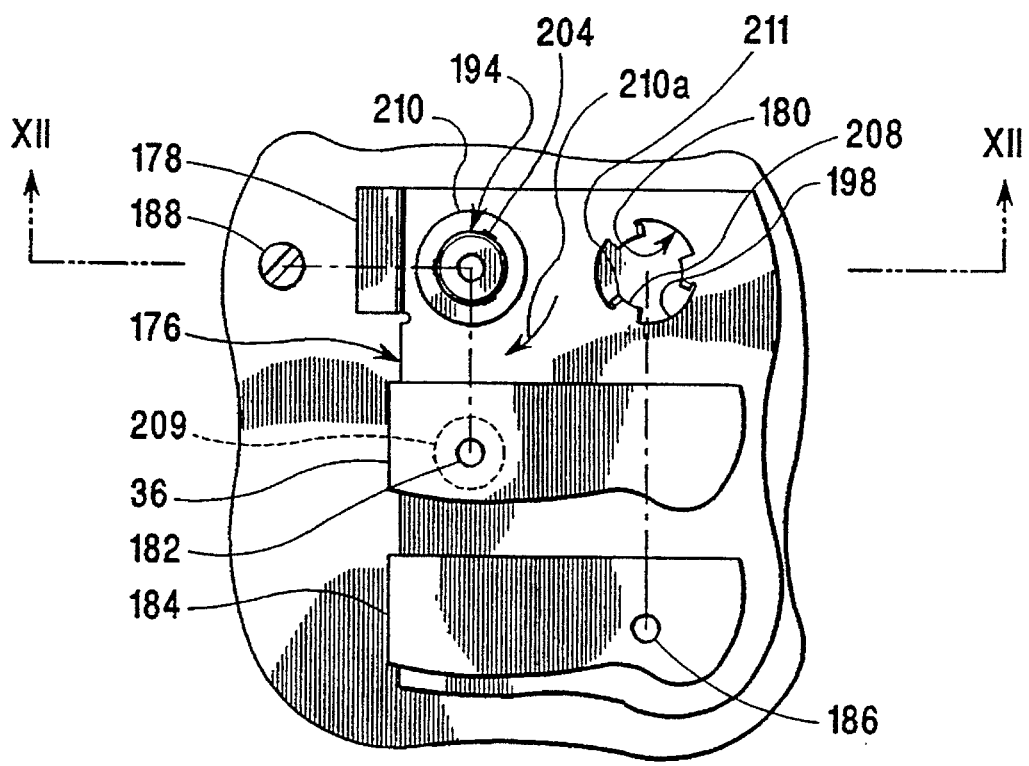
FIG. 11 is a fragmentary plan view of an attachment mechanism mounting a planar board in the computer of FIG. 1, including, in an exploded relationship, two different types of planar boards, either of which may be mounted within the computer.
Figure 12:
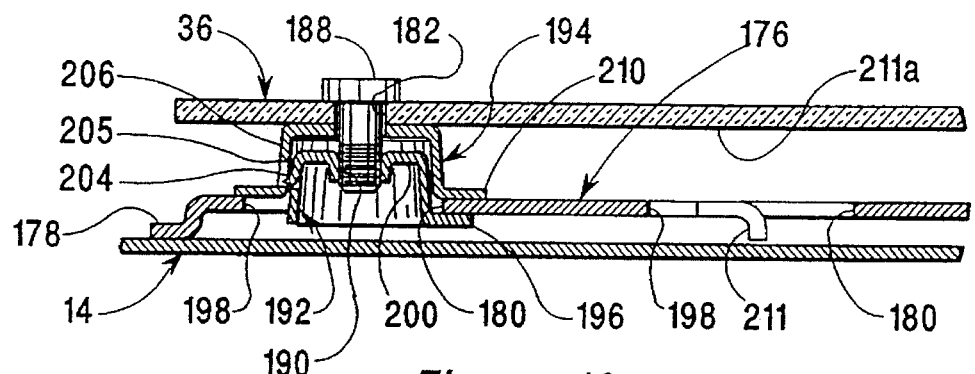
FIG. 12 is a cross-sectional elevation through the attachment mechanism of FIG. 11, taken as indicated by section lines XII—XII in FIG. 11.
Figure 13:
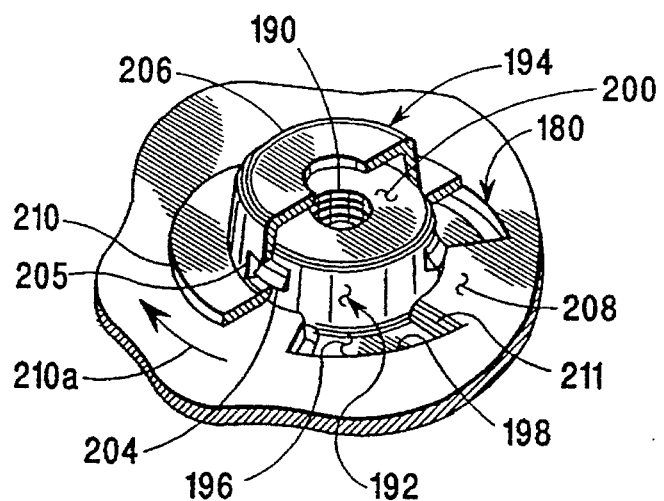
FIG. 13 is a fragmentary isometric view of the attachment mechanism of FIG. 11 as viewed from above and in front of this mechanism.

FIGS. 11 through 13 show a method used to attach planar board 36 within frame 14, with FIG. 11 providing a plan view showing the use of the method to attach either of two different types of planar boards, with FIG. 12 providing cross-sectional elevation through the attachment mechanism used by this method, taken as indicated by section lines XII—XII in FIG. 11, and with FIG. 13 providing an isometric view of this attachment mechanism.

Referring first to FIG. 11, a mounting plate 176 is attached inside frame 14, for example by welding at various tabs 178. Mounting plate 176 provides a number of attachment holes 180, each of which defines a location at which planar board 36 may be fastened. In general, mounting plate 176 is configured to provide for the attachment of any one of a number of different planar boards, with the required attachment points for any one planar board being a subset of the total number of attachment holes 180. For example, mounting plate 176 may be configured for the attachment of either planar board 36, having a mounting hole 182, or of an alternate planar board 184, having a mounting hole 186 at a position not corresponding to that of mounting hole 182.

Referring also to FIG. 12, to allow the alternate attachment of planar boards 36 and 184, mounting plate 176 includes a hole 180 corresponding to the location of each mounting hole 182 and 186. The attachment of planar board 36 is accomplished by means of a screw 188 extending through mounting hole 182 to engage a threaded surface 190 of a formed nut 192. Planar board 36 is clamped in a spaced-apart relationship with mounting plate 176 through the use of a formed spacer 194.

Referring also to FIG. 13, hole 180 and formed nut 192 include particular provisions for allowing the installation of formed nut 192 and spacer 194 to mounting plate 176 after plate 176 is welded in place within frame 14. Nut 192 includes three angularly spaced flange segments 196, which fit through three outward-extending aperture segments 198 within each hole 180. Formed nut 192 and spacer 194 are assembled together with tapered upstanding portion 200 of formed nut 192 extending within central portion 202 of spacer 194. Upstanding portion 200 includes three outward-extending lanced tabs 204, which snap into three slots 205 within upstanding portion 206 of formed spacer 194 as spacer 194 is brought into engagement with nut 192. In the process of attaching a planar board, such as planer board 36 or alternate planar board 184, assemblies thus formed of nuts 192 and spacers 194 are inserted into holes 180 corresponding to the locations of mounting holes 182 in the planar board to be attached. This insertion is accomplished with flange segments 196 dropping through aperture segments 198. Each of these assemblies is then rotated in a hole 180, so that the inward extending tabs 208 of the hole 180 are clamped between flange segments 196 of formed nut 192 and flange 210 of spacer 194 when screw 188 is tightened in the direction of arrow 210*a* in threaded surface 190 of nut 192. These tabs 208 extend inward between adjacent aperture segments 198. To assure that this tightening process leaves flange segments 196 aligned to clamp the tabs 208, each tab 208 includes a downturned portion 211 restricting motion beyond an angle at which flange segments 196 are fully under the tabs 208.

Some or all of the areas around mounting holes, such as mounting holes 182 and 186, on a typical planar board are used to provide electrical grounding for various ground planes or other circuits within the board. Conductive pads around the mounting holes, on one or both sides of the planar board, electrically connected to circuits needing the grounding function, are provided for this purpose. For example (as shown in FIG. 11) a conductive pad 209 may be provided around hole 182. Effective grounding of this kind is required to minimize the emission from the system of radio frequency interference (RFI). To be effective in this regard, the grounding means must be capable of carrying radio frequency signals.

In the structure described above, mounting plate 176 is used with spacer 194 and formed nut 196 to provide electrical grounding paths capable of carrying radio frequency electrical signals. These parts are preferably composed of metallic materials with surface coatings minimizing the formation of surface oxidation. Such materials and coatings are well known to those skilled in the art. This assembly is particularly effective in providing this kind of electrical grounding, because relatively large contact surface areas are available, and because relatively high contact forces can be derived from the thrust force provided by tightening screw 188 in threaded surface 190. Thus, as screw 188 is tightened, the lower surface 211*a* of planar board 36 is clamped directly to the upper surface of spacer 194. If electrical grounding is to occur at this location, a conductive pad planar board 36 includes a conductive pad on its lower surface 211*a* around hole 184, so this clamping provides a suitable contact between this conductive pad and spacer 194. Furthermore, as screw 188 is tightened, tabs 208 are clamped tightly between flange segments 196 of nut 192 and flange 210 of spacer 194, providing suitable contact between spacer 194 and mounting plate 176. A secondary grounding path may also be provided through a pad 187 on the upper surface of planar board 36 to the underside of the head of screw 188, through the threaded portion of screw 188 to the threaded surface 190 of nut 192, and through flange segments 196 to tabs 208.

Referring to FIG. 12, planar board 36 is generally of a modern type, having conductive traces and electronic components on both sides. On each side of planar board 36, an annular space around each mounting hole 182 is reserved for mounting, and often for electrical grounding, purposes, being free from components and traces except for conductive grounding pads, such as pad 209 (shown in FIG. 11). However, locations corresponding to the places used for mounting other types of planar boards cannot be expected to be free from components or circuit traces. Therefore, the ability to move nut 192 and spacer 194 between the various holes 180 in mounting plate 176 is particularly important; along with a capability for providing mounting hardware where it is needed, this method provides a capability for removing mounting hardware from positions where it is not needed, and where it would otherwise interfere with mounting a planar board by contacting circuit traces and electronic components.

These capabilities provide an advantage in the manufacturing process, allowing a single frame 14 to be used with a number of different types of planar boards, such as planar boards 36 and 184, to build different system models. Furthermore, these capabilities provide an advantage of allowing subsequent upgrading to a new type of planar having a different mounting configuration.

Figure 14:
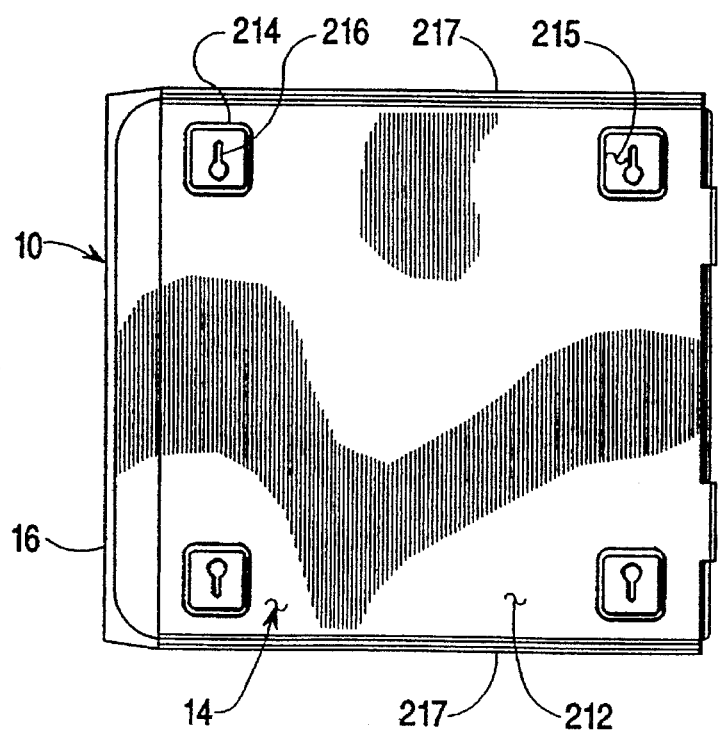
FIG. 14 is an underneath plan view of the computer of FIG. 1, showing in particular means provided to facilitate mounting the computer in a vertical orientation on a wall.

Referring to FIG. 14, the underside 212 of frame unit 14 includes four foot structures 214, each of which provides an elastomeric pad 215, establishing an appropriate surface for contact with a furniture surface, such as a desk top, and a keyhole-shaped aperture 216 for accepting the head portion of a headed fastener, such as a screw of nail, which may be used to hang computer 10 on a wall surface. Preferably, when the computer 10 is hung from a wall surface, two of the foot structures 214 adjacent to a side surface 217 are used in this way, so that the system unit is hung with the upper bezel 16 facing toward either the right or left on the wall. When the computer 10 is hung in this way, the servicing or reconfiguration of components is easily accomplished by opening top cover 12 as previously described; there is no need to remove the computer 10 from its position on the wall for this purpose.

Figure 15:
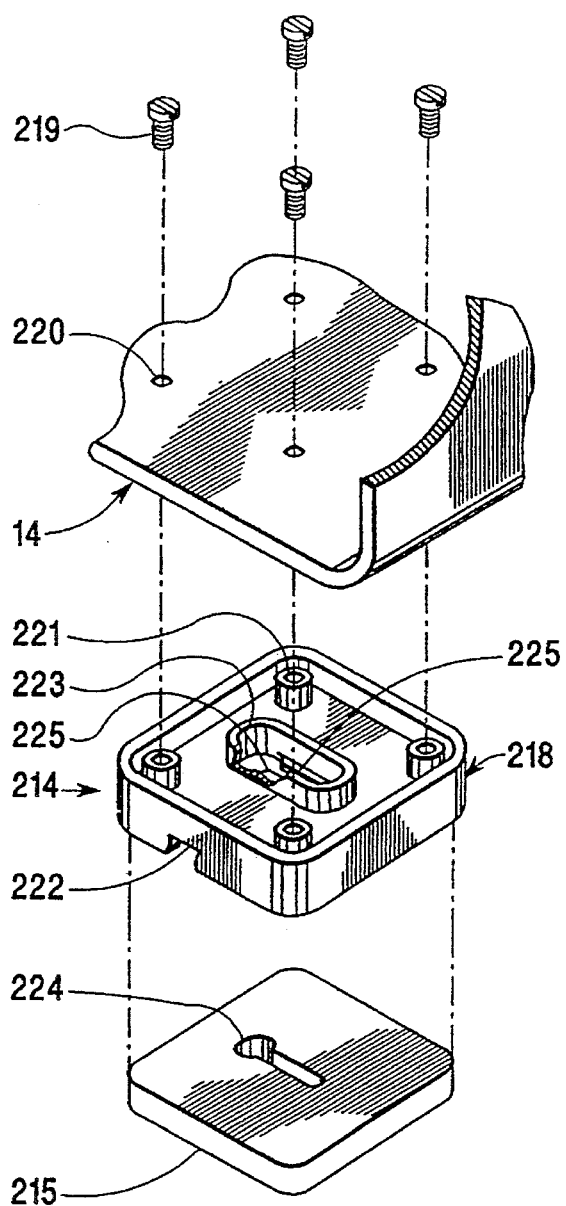
FIG. 15 is an exploded isometric view of foot assembly attached to an underside of the frame of the computer of FIG. 1.

Referring to FIG. 15, each foot structure 214 includes a housing 218 fastened to the underside of frame 14 by means of four screws 219, each of which extends downward through a hole 220 provided in frame 14 to engage a hole 221 in housing 218. Housing 218 is preferably composed of a thermoplastic resin material. An elastomeric pad 215 is adhesively attached to a lower surface 222 of housing 218. Keyhole-shaped apertures 223 and 224 are also provided in housing 218 and elastomeric pad 215, respectively. (Wall sections of housing 218 are partially cut away in FIG. 15 to reveal lower surface 222 and aperture 223.)

Referring to FIGS. 14 and 15, computer 10 may be hung from the wall using two of these structures 214 to engage headed fasteners (not shown). The computer 10 is first placed with the heads of the headed fasteners extending through the enlarged portions of keyhole-shaped apertures 223 and 224. The computer 10 is then allowed to slide downward, so that the head of each fastener is trapped between a pair of flanges 225, extending to define the narrowed portion of aperture 223, and an adjacent surface of underside 212 of frame 14. Computer 10 may be subsequently removed from the wall by lifting upward, so that the fastener heads are again aligned with the enlarged portions of keyhole-shaped apertures 223 and 224, and by pulling outward from the wall.

Figure 18:
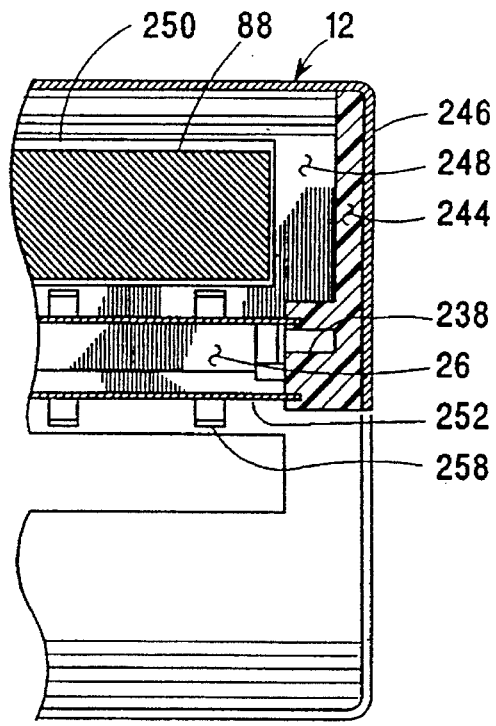
FIG. 18 is a fragmentary rear cross-sectional view of an intermediate portion of the computer of FIG. 6, showing the engagement of conductive shields, taken as indicated by section lines XVIII—XVIII in FIG. 16.
Figure 19:
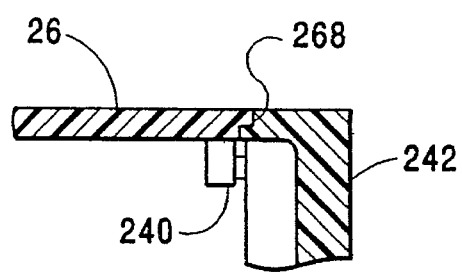
FIG. 19 is a fragmentary plan view of a media access door of the computer of FIG. 6, taken as indicated by section lines XIX—XIX in FIG. 17.
Figure 16:
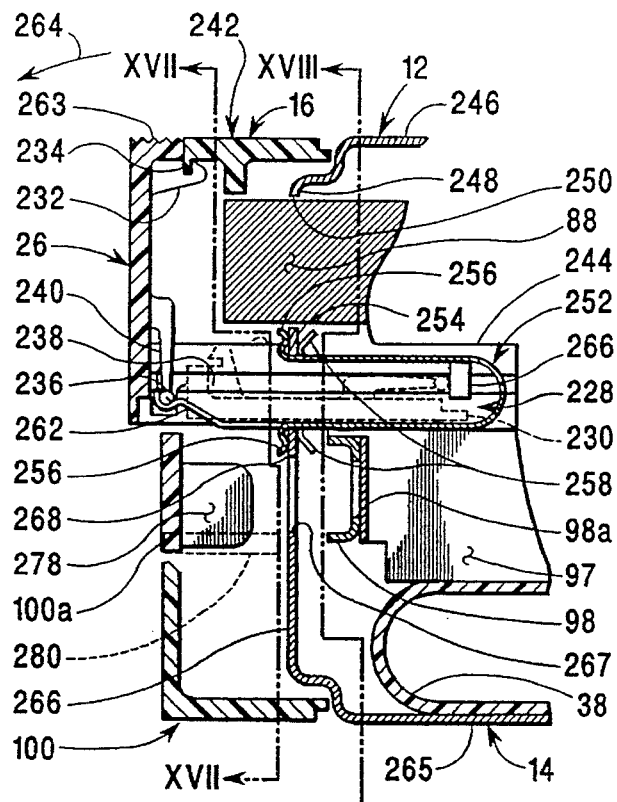
FIG. 16 is a fragmentary right cross-sectional elevation of a front portion of the computer of FIG. 6, taken as indicated by section lines XVI—XVI in FIG. 6, but with the computer in a closed, operational position.
Figure 17:
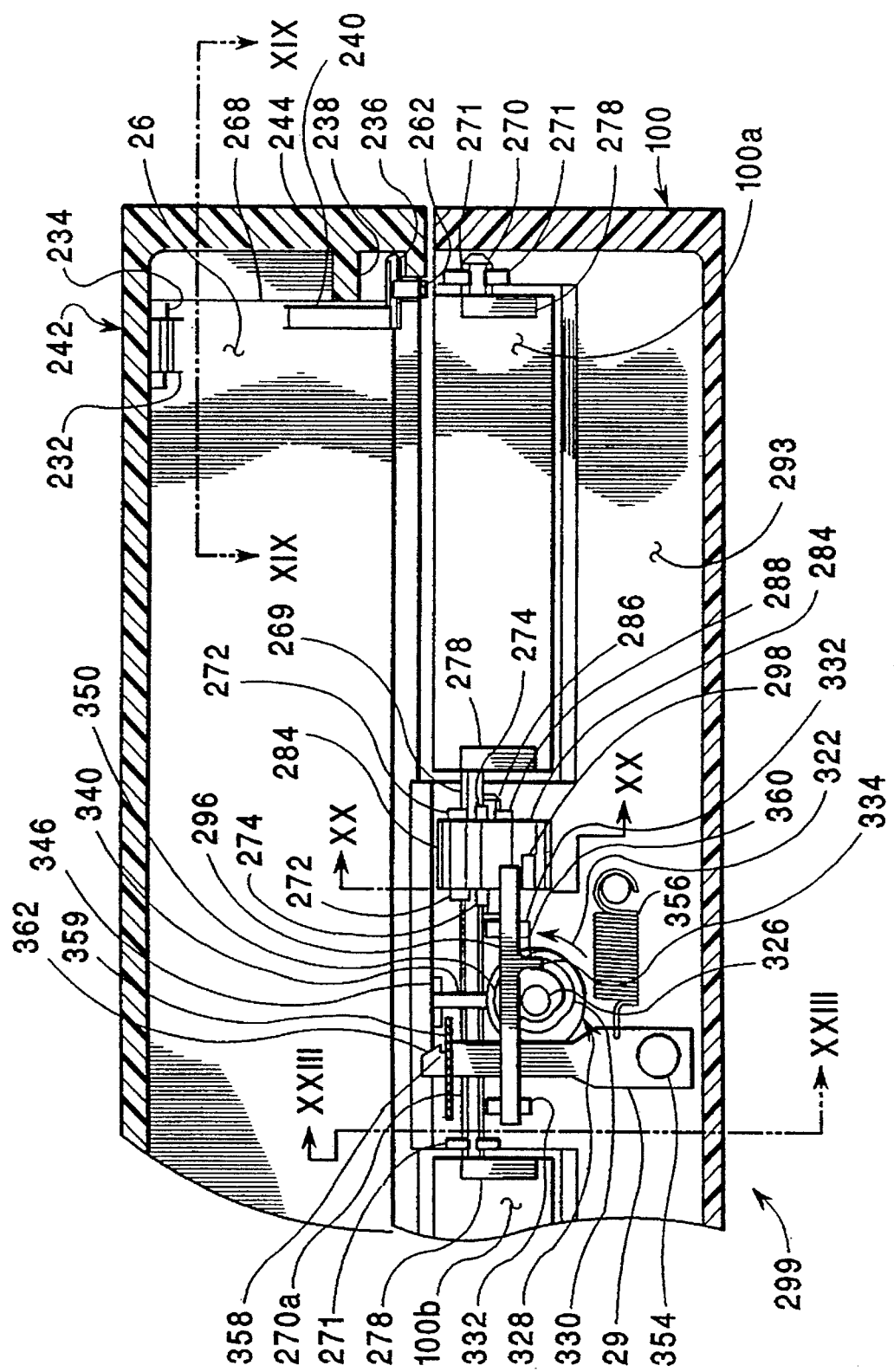
FIG. 17 is a fragmentary rear cross-sectional elevation of a front portion of the computer of FIG. 6, showing access doors in front surfaces of the system and a locking mechanism, taken as indicated by section lines XVII—XVII in FIG. 16.

The operation of media access door 26, which is opened to provide access to DASD devices 88 for the removal and replacement of magnetic media, will now be discussed, with particular reference being made to FIGS. 16 through 19. FIG. 16 is a right cross-sectional elevation, taken as indicated by section lines XVI—XVI in FIG. 6. FIG. 17 is a partial rear cross-sectional elevation, taken as indicated by section lines XVII—XVII in FIG. 16, showing particularly the internal features of door 26. FIG. 18 is another partial rear cross-sectional elevation, taken as indicated by sections lines XVIII—XVIII in FIG. 16, showing particularly metallic structures used for electromagnetic shielding. FIG. 19 is a partial cross-sectional plan view, taken as indicated by section lines XIX—XIX in FIG. 17, showing the engagement between the ends of door 26 and the opening for this door within upper bezel 16. As shown in FIG. 16, a provision is made for allowing media access door 26, in upper bezel 16, to be pivoted downward manually and to be pushed into a pocket 228 in an open horizontal orientation indicated by dashed lines at 230.

Referring to FIGS. 16 and FIG. 17, each end of door 26 is held in a closed position, at its top edge by means of a slotted tab 232, near each (right and left) end of the door 26, engaging a downward-extending tab 234, and at its lower edge by means of a cylindrical tab 236 engaging a downward extending portion of a slot 238. Cylindrical tab 236 extends at each end of the door from the lower end of a descending support structure 240. A housing 242 of upper bezel 16 includes, outwardly adjacent to each end of door 26, a sidewall portion 244 extending into system 10. Each sidewall portion 244 includes, directed toward the adjacent door 26, the door guiding slot 238. Door 26 and housing 242 are preferably composed of suitable plastic resin materials, allowing the fabrication of slotted tabs 232, support structures 240, and cylindrical tabs 236 as integral portions of door 26, and further allowing the fabrication of downward-extending tabs 234 and sidewall portions 244 with slots 238 as integral portions of housing 242.

Referring to FIGS. 16 and 18, the metal enclosure 246 of top cover 12 includes a downward-extending front portion 248 with a slot 250 through which DASD devices 88 may extend. A "U"-shaped flexible shield 252 extends below a lower edge section 254 of front portion 248, providing an electromagnetic shield around pocket 228. Front edges of shield 252 are divided into lip portions 256 and intervening tab portions 258, which provide electrical contact with enclosure 246 by clamping lower edge section 254. Shield 252 extends into slots 260, to be held in place at each end within a sidewall portion 244. Shield 248 also includes, adjacent to each end, a spring tab 262, which extends forward to push upward on a cylindrical tab 236 of door 26, holding door 12 closed by maintaining engagement between slotted tabs 232 and downward-extending tabs 234.

Door 26 is opened by pushing downward at a ridged gripping surface 263 to release slotted tabs 232 from engagement with downward-extending tabs 234, and by subsequently rotating the door downward in the direction of arrow 264. As the door is rotated downward, spring tabs 262 continue to push upward on cylindrical tabs 236, aiding in the alignment of these tabs with the rearward-extending, horizontal portion of slot 238. Door 26 may then be pushed to the rear, into pocket 228, to the position indicated by dashed lines 230. The rearward motion of door 26 is limited by a pair of stop tabs 266 extending within shield 248 to contact cylindrical tabs 236 as door 26 is moved fully rearward. As shown in FIG. 19, the edges 268 at the right and left ends of door 26 are preferably shaped to prevent inward movement of the door unless the door is rotated downward, to be pushed straight inward.

Door 26 is subsequently closed by pulling forward, with cylindrical tabs 236 being pulled in slots 238. Door 26 is then rotated upward, opposite the direction of arrow 264, to be snapped into-engagement with tabs 234 extending downward from housing 242.

FIGS. 16 through 18 also show the alternate lower bezel 100, including a pair of lower doors 100a and 100b. Referring first to FIG. 16, as previously discussed in reference to FIG. 6, each door 100a or 100b is used to obtain access to a slot 98a in a bracket 98, which is a part of an alternate central support structure 97. The metallic enclosure 265 of frame 14 includes an upward-extending portion 266, which has an access slot 267 adjacent to each slot 98a. An upper edge portion 268 of upward-extending portion 266 is clamped between lip portions 256 and intervening tab portions 258 of shield 252, thereby assuring electrical continuity between shield 252 and frame enclosure 265.

Referring to FIG. 17, lower door 100a includes a central pivot shaft 269, extending toward the center of computer 10, and an outer pivot shaft 270, extending away from the center of computer 10. Lower door 100b includes an elongated central pivot shaft 270a and an outer pivot shaft (not shown). Lower door 100a is pivotally mounted in lower bezel 100, with outer pivot shaft 270 being snapped into place to pivot between a pair of flexible bearing tabs 271, with central pivot shaft 269 being snapped into place to pivot between a flexible bearing tab 272 and a central bearing tab 274. Lower door 100b is pivotally mounted in lower bezel 100, with elongated central pivot shaft 270a being snapped into place to pivot between a flexible bearing tab 272 and a central bearing tab 274, and also between another pair of flexible bearing tabs 271. The outer end of door 100b is pivotally mounted in a manner similar to the outer end of door 100a. Pivot shafts 269, 270, and 270a extend from tabs 278, which in turn extend into computer 10 as a part of doors 100a and 100b. This mounting provides for the rotation of each door 100a or 100b between a vertical position and a horizontal position, as indicated by dashed lines at position 280 in FIG. 16.

Figure 20:
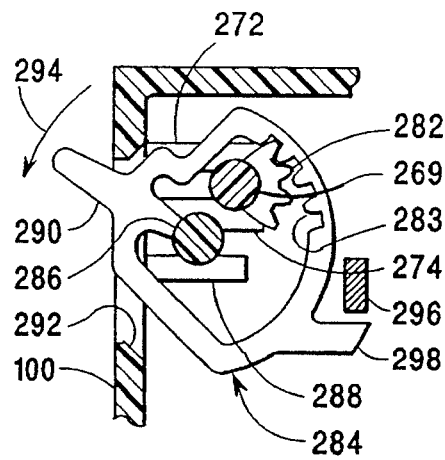
FIG. 20 is a fragmentary right cross-sectional elevation of a door actuating mechanism of the computer of FIG. 6, taken as indicated by section lines XX—XX in FIG. 17.

FIG. 20 is a partial right cross-sectional elevation, taken as indicated by section lines XX—XX in FIG. 17, to show the method provided to facilitate the manual opening and closing of doors 100a and 100b. A sector gear 282 is formed at an end of each central pivot shaft 269 and 270a. Both of these sector gears 282 engage internal teeth 283 of a lever actuator 284, which is pivotally mounted between the two doors 100a and 100b by means of an integral pivot shaft 286 extending from each side of actuator 284 to be snapped between a central bearing tab 274 and a flexible bearing tab 288. Central pivot shafts 269 and 270a are arranged in a coaxial alignment, and the two sector gears 282 are rotationally aligned to engage the same internal teeth 283. A lever tab 290 of lever actuator 284 extends through a slot 292 in the front housing wall 293 of lower bezel 100, providing the appearance and manual operating characteristics generally associated with an electrical switch.

Thus, when lever tab 290 is pushed downward to rotate lever actuator 284 in the direction of arrow 294, shafts 269 and 270 turn to rotate lower doors 100a and 100b into the horizontal orientation shown by dashed lines at position 280. Similarly, the subsequent rotation of lever actuator 284 opposite to the direction of arrow 294 rotates doors 100a and 100b into the closed position. However, this motion can be prevented by the movement of a locking bar 296 into a position stopping the passage of tab 298 of actuator 284.

Figure 21:
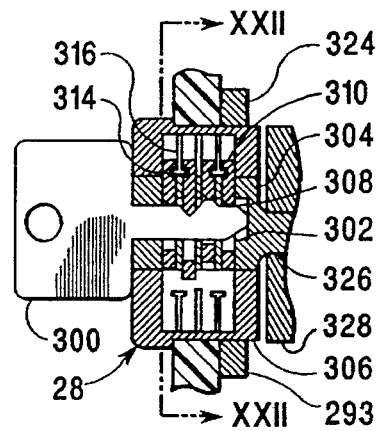
FIG. 21 is a fragmentary longitudinal cross-sectional elevation of a lock of the computer of FIG. 6, taken as indicated by section lines XXI—XXI in FIG. 9.
Figure 23:
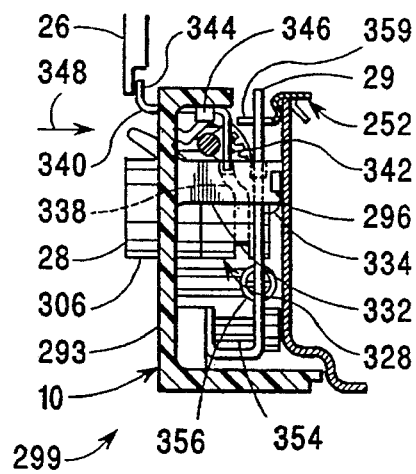
FIG. 23 is a fragmentary right cross-sectional elevation of the locking mechanism of FIG. 17, taken as indicated by section lines XXIII—XXIII in FIG. 17.
Figure 22:
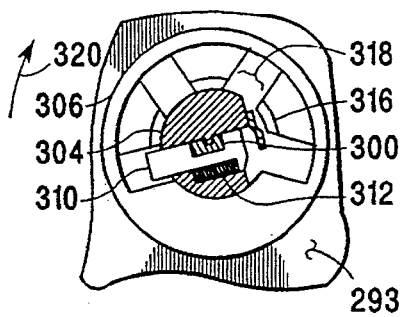
FIG. 22 is a fragmentary transverse cross-sectional elevation of the lock of FIG. 21, taken as indicated by section lines XXII—XXII in FIG. 21.

A multi-functional locking mechanism 299 for moving locking bar 296 to lock lower doors 100a and 100b closed, for locking media access door 26 closed, and also for locking top cover 12 closed will now be discussed, with particular reference being made to FIG. 17 and to FIGS. 21 through 23. FIGS. 21 and 22 show the lock 28, with FIG. 21 being a longitudinal cross-sectional elevation of the lock, while FIG. 22 is a transverse cross-sectional elevation taken as indicated by section lines XXII—XXII in FIG. 21. FIG. 23 is a right side cross-sectional elevation, taken as indicated by section lines XXIII—XXIII in FIG. 17 to show the multi-functional locking mechanism 299 located near the center of frame unit 14.

Referring first to FIGS. 21 and 22, lock assembly 28 is operated by inserting a key 300 into a slot 302 within a lock rotor 304, and by rotating the rotor 304 within a stator 306, by means of the key, among four rotary positions. As key 300 is inserted, its encoded edge 308 engages a number of tumblers 310, each of which is held against the edge 308 by means of a compression spring 312. Each tumbler 310 is thus moved outward through a distance corresponding to the location of the part of encoded edge 308 contacted by the tumbler 310. Each tumbler 310 includes a slot 314, with variations in the distance between this slot 314 and the points at which the tumblers contact the encoded edge providing the means for encoding the lock 28. Thus, if a properly encoded key 300 is fully inserted, all of the slots 314 are aligned to allow rotation past a barrier 316 extending inward as a part of stator 306. As shown in FIG. 22, barrier 316 is divided into three segments, each of which extends inward between two of the four slots 318. When the tumblers 310 are aligned with one of these slots 318, the key 300 may be inserted and withdrawn. Rotor 304 can be rotated to bring tumblers 310 out of alignment with a slot 318 only if a properly encoded key is fully inserted in slot 302. The lock assembly 28 is preferably configured so that a key 300 cannot be removed from slot 302 unless tumblers 310 are aligned with one of the slots 318. This is achieved by assuring that at least one of the tumblers 310 must be moved outward during the process of removing key 300.

In FIG. 17 and in each FIG. 20 through 23, the locking mechanism is shown in the first position, in which top cover 12 and all doors 26, 100a, and 100b are locked. From this position, lock rotor 304 can be rotated in the direction of arrow 320 in FIG. 22, and of arrow 322 in FIG. 17, into second through fourth positions. In the second of these positions, top cover 12 and doors 100a and 100b remain locked, while media access door 26 is released. In the third of these positions, all doors 26, 100a, and 100b are released, while top cover 12 remains locked. In the fourth of these positions, top cover 12 and all doors 26, 100a, and 100b are released to be opened.

The lock stator 306 is attached to front housing wall 293, being clamped in place, for example, using a collar 324. A flat or key slot arrangement (not shown) is preferably also used to assure the correct orientation of stator 306 within housing wall 293. A shaft 326 extends rearward into computer 10 as a part of lock rotor 304. The various locking functions are performed by means of a cam 328 rigidly attached to shaft 326.

Referring to FIGS. 17 and 23, the rear surface of cam 328 includes a spiral groove 330. Locking bar 296, which is slidably mounted in a pair of slotted tabs 332 extending into system 10 from front housing wall 293, includes a tab 334 extending downward and into groove 330. When the locking mechanism is in its first and second positions, tab 334 is in a portion of groove 330 at its outermost radial location, holding locking bar 296 interposed above tab 298 to prevent the rotation of actuator 284 in the direction of arrow 294 (as shown in FIG. 20). As the locking mechanism is rotated between its second and third positions, rotating cam 328 in the direction of arrow 322, the inward spiral shape of groove 330 causes the movement of locking bar 296 in the direction of arrow 336, releasing tab 298, so that actuator 284 can be moved in the direction of arrow 294 to open doors 100a and 100b. As the locking mechanism is further rotated between the third and fourth positions, tab 298 remains in a portion of groove 330 at its innermost radial location, so locking bar 296 is held away from tab 298. Thus, doors 100a and 100b are unlocked when the locking mechanism is in its third and fourth positions.

Referring to FIG. 23, cam 328 also includes a peripheral groove 338 extending around a portion of its cylindrical outer surface. A latching bracket 340 includes a tab 342 descending into this groove 338 and a tab 344 ascending toward media access door 26. Latching bracket 340 is mounted to slide in a track 346 within bezel 100, in the rearward direction indicated by arrow 348 from the forward position in which it is shown. In this forward position, tab 344 blocks the downward motion of media access door 26 required to disengage slotted tabs 232 from downward-extending tabs 234 (shown in FIG. 16). In this way, media access door 26 is locked in a closed position. As the locking mechanism is rotated from its first position to its second position, the slope of groove 338 moves locking bracket 340 to the rear, so that tab 344 clears door 26, allowing the downward motion required to begin the process of opening the door. As the locking mechanism is rotated into its third and fourth positions, locking bracket 340 remains in its rearward position, with door 26 unlocked.

Referring to FIG. 17, cam 328 also includes a peripheral cam surface 350. Cover latch 29, which is pivotally mounted in lower bezel 100 by means of a pin 354, is held against this cam surface by an extension spring 356. The tip of latch 29 includes a notch 358, which engages a slot 30 (shown in FIG. 3) to hold top cover 12 in a closed position. This slot 30 may be, for example, formed in a tab 359 extending from shield 252 (as shown in FIG. 23). The top cover is thus locked shut when the lock mechanism is in its first through third positions. However, as the lock mechanism is rotated between the third and fourth positions, in the direction of arrow 322, the outward ramped portion 360 of peripheral cam surface 350 moves notch 358 in the direction of arrow 336, releasing the engagement of this notch 358 with slot 30. In this way, the top cover is locked closed when the lock mechanism is in its first to third positions, to be released as the locked mechanism is rotated into its fourth position. If top cover 12 is closed while the lock mechanism is in its fourth position, it remains shut but unlocked. If top cover 12 is closed while the lock mechanism is in another position, the angle of tip surface 362 moves latch 29 in the direction of arrow 336, to be returned subsequently by means of spring 356, so that the cover 12 is locked down as it is closed.

Thus, multi-function locking mechanism 299 provides several levels of security without requiring several different keys or different locking mechanisms. The first level of security prevents both unauthorized use of the DASD devices and access to all subassemblies within computer 10. The second level of security allows access to the removable media of DASD devices, while preventing access to subassemblies within the computer. The computer can be fully functional at this level; it can be used for all normal functions, even when it is necessary to change the media in DASD devices having removable media. However, since access to subassemblies is prevented, theft is expected to be reduced. Theft of sensitive data can also be protected by software means, such as encryption and the requirement for a password to operate some or all system functions. The third level of security also permits access to the slots 98a of central support structure 97, while continuing to prevent access to subassemblies within the computer. The significance of this level of security is dependent on the devices mounted in these slots 98a. The fourth level of security also permits access to all subassemblies within the computer. This level must be accessed for repair and reconfiguration of the hardware. While the use of a properly encoded key 300 is required to move locking mechanism 299 among these various levels of security, the key 300 may be removed to leave the mechanism 299 at any such level of security.

While the door operation and locking aspects of the present invention has been shown and discussed in a version of a system including a lower bezel 100 having lower doors 100a and 100b, it is understood that various aspects of this invention can readily be applied to a version of the system having lower bezel 14 (shown in FIG. 3) without lower doors. Various mechanisms associated with the lower doors, such as lever actuator 284 (shown in FIG. 20) and locking bar 296 (shown in FIG. 17), would not be included in such a version. While the third position of the locking mechanism, for releasing the doors 100a and 100b could be omitted, reducing the number of slots 318 in stator 306 (shown in FIG. 22), this difference from the version described above is not required. Similarly, it is possible but not necessary to modify the configuration of cam 328 by eliminating groove 330 (shown in FIG. 17). It is a matter of manufacturing convenience whether such differences are implemented in two different versions of a computer system.

Significant advantages of the present invention, when compared to the background art, arise from the fact that a level of security may be selected with the key, which is then removed, causing the system to remain at that level of security. For example, the system may be left in a fully operational state, providing media access for the DASD devices, without exposing the internal subassemblies. The key can be withdrawn and taken away at this or any other level of security. This feature contrasts with locking mechanisms which leave computers of the background art in either a totally locked or a totally unlocked condition.

Provisions for disengaging the top cover 12 from the frame 14 will now be discussed in reference to FIGS. 24 through 26. FIG. 24 is a fragmentary underneath cross-sectional plan view, taken as indicated by section lines XXIV—XXIV in FIG. 7 to show a hinge coupling 104 used for releasably engaging pivot bail 27 with top cover 12. FIG. 25 is a fragmentary right side cross-sectional elevation, taken as indicated by section lines XXV—XXV in FIG. 24. This mechanism may be used, for example, in changing the top cover to a different type, providing even greater configurational flexibility. The method chosen for allowing this disengagement requires that the system must be unlocked to open top cover 12 before the process of disengagement is begun. Thus, the protection afforded by the multi-functional locking mechanism 299 is not compromised by the provision made for disengaging cover 12 from frame 14.

Referring to FIGS. 24 and 25, each hinge coupling 104 includes a coupling bracket 370 and a coupling spring 372. Coupling bracket 370 is welded to metal enclosure 246 of top cover 12 with coupling spring 372 mounted to slide between a crossmember 374 formed as a part of coupling bracket 370 and an adjacent surface of enclosure 246. In this way, coupling spring 372 is assembled during the welding process as a captive part, which can be moved back and forth, but which cannot be removed. Pivot bail 27 is pivotally mounted between a downward curved bracket portion 376 of coupling bracket 370 and a downward curved spring portion 378 of coupling spring 372. Frictional engagement between the coupling spring 372 and the surfaces on which it slides is ensured by curving a central portion of the coupling spring as generally indicated by dashed line 380 before the welding process. Thus, frictional engagement prevents the motion of coupling spring 372 in the absence of externally applied forces.

Pivot bail 27 is disengaged from the hinge coupling 104 by applying pressure to spring tab 382 in the direction of arrow 384, causing the deflection of spring tab 382 in the direction of arrow 386, along with the sliding of coupling spring 372 in the direction of arrow 388. In this way, coupling spring 372 is moved into the position indicated by dashed lines at position 390, opening the space between downward curved spring portion 378 and downward curved bracket portion 376 to release bail 27 as indicated by dashed lines at position 392.

Coupling bracket 370 includes a tab 394 extending toward an opening 396 of an adjacent pocket 398 formed in coupling spring 372. If an attempt is made to move the spring 372 in the direction of arrow 388 without exerting a downward force on tab 382, pocket 398 is moved over tab 394, so that this motion in the direction of arrow 388 is limited to a travel distance insufficient to release pivot bail 27. Thus, pulling the outward extending portion 400 of coupling spring 372 does not result in releasing bail 27 from the coupling 104. To release the bail 27, it is therefor necessary to open top cover 12, having released latch 29 by means of lock 28 (shown in. FIG. 23), so that a downward force may be applied to deflect spring tab 382 in the direction of arrow 386. In this way, the ability of the lock mechanism to prevent access to various subassemblies within system unit 10 is maintained.

Hinge coupling 104 may be engaged with pivot bail 27 essentially by reversing the procedure described above. With coupling spring 372 in the open position indicated at dashed lines 390, pivot bail 27 is introduced into the opening provided between downward curving spring portion 378 and downward curving bracket portion 376. Coupling spring 372 is then slid in the direction opposite arrow 388, as spring tab 382 is pulled downward to cause deflection in the direction of arrow 386.

In order to disengage the top cover 12 from frame unit 14, travel limiting linkage 110, which has been described in reference to FIGS. 7 and 8, is disengaged from top cover 12. FIG. 26 shows a pin 115 configured to provide for this disengagement. This pin 115 includes a solid portion 406 extending through a hole in metal enclosure 246 of top cover 12 to a rivet head 408. Pin 115 also includes a hollow portion 410 extending inward to engage a pivot hole 412 in upper link 114. Mutually perpendicular slots 413 extend along the length of hollow portion 410, providing flexibility by dividing this portion 410 into four sections. Pin 115 is fastened to metal enclosure 246 by forming a shoulder portion 414 at an end of hollow portion 410. An enlarged portion 416 is also formed at a tip of hollow portion 410, providing a surface over which upper link 114 is snapped to be engaged with, or released from, pin 115. Thus, the top cover 12 must be opened, having been unlocked, for the removal of link 114 from pin 115, by sliding the link inward on the pin.

While the preceding discussion has been related to the releasable engagement of pivot bail 27, it is understood that hinge coupling 104 could be used with equal effectiveness to establish the releasable engagement of another type of pivot pin structure, such an a hinge pin fastened directly to a frame for pivotally mounting a cover.

Referring again to FIG. 3, a long gap, or seam is presented around the interface between top cover 12 and frame 14. Since both metal enclosure 246 of top cover 12 and metal enclosure 265 of frame 14 are used to provide shielding for minimizing the emission of electromagnetic energy at radio frequencies, which could otherwise interfere with communication signals, it is necessary to provide a number of electrical contact points spaced along this gap. Naturally, this shielding is effective only when the top cover 12 is closed (as shown in FIG. 1), but the top cover should be closed for system operation. Some of these contact points are formed at the interface between shield 252 and frame metal enclosure 265, as described above in reference to FIG. 16. Others of these contact points are formed through the use of flexible contact segments 31, which extend along a downward-extending skirt portion 420 at each side of cover metal enclosure 246. At each side, the skirt portion 420 fits inside an adjacent side portion 424 of frame enclosure 265, with electrical contact being effected between the convex-curved portion of each contact segment 31 and an adjacent inner surface of side portion 424. While the distance required between adjacent contact points depends in part on a number of operating parameters, such as the clock frequencies of computer 10, this method of forming flexible contact segments 31 can readily be used to produce contact spacings of 0.75 to 1.5 inch as typically required. Similarly the spring tabs 258 (shown in FIGS. 16 and 18), which extend as portions of shield 252 to contact frame metal enclosure 265, may be placed as close together as necessary for effective shielding.

The method used to provide these flexible spring segments 31 will now be explained with reference being made to FIGS. 27 and 28. FIG. 27 is a fragmentary right side elevational view, showing the lower front corner portion of top cover 12. FIG. 28 is a fragmentary front elevational view, taken through the center of a contact segment 31, as indicated by section lines XXVIII—XXVIII in FIG. 27. Referring first to FIG. 27, the individual contact segments 31 are formed as "T"-shaped portions of a spring strip 422 extending along each skirt portion 420. In the assembly process, spring strip 422 is first fit into a number of essentially triangular apertures 424 in skirt portion 420, with the widened end 426 of each contact segment 31 fitting through an aperture 424. Referring to FIG. 28, the "U"-shaped lower portion 428 of spring strip 422 is then welded along the lower edge of skirt portion 420. The engagement of each widened portion 426 within an aperture 424 serves to maintain the convex shape of each contact segment 31.

As shown in FIG. 29, specialized mounting bracket configurations may alternately be attached to slotted bracket 71, by screws 73 in place of blank brackets 77, (shown in FIG. 3) to provide additional types of I/O ports or solid-state removable media. For example, a feed-through mounting bracket 450 includes a pair of connectors 452, which are electrically connected by wires 454 and a connector 456 to a circuit card 458. Connectors 452 carry electrical signals into or out of computer 10 through a slot 74 in bracket 71. A bracket 450 of this kind may be used, for example, to connect audio signals with circuits in computer 10.

A socket 460, built in accordance with the standards of the Personal Computer Memory Card Industry Association (PCMCIA) is similarly mounted to slotted bracket 71, by means of a socket mounting bracket 462. In accordance with well known standards, socket 460 removably accepts a pair of circuit cards, which may be manually inserted into upper and lower slots in the direction of arrow 466. Socket 460 includes a number of terminal pins (not shown), which extend into sockets in an end of card, making electrical contact with terminal springs (not shown) within card 464. Additional mechanisms (not shown), associated with socket 460, are further configured in accordance with well known standards to provide additional features. As a card 464 is inserted, an ejection mechanism (not shown) is conditioned to facilitate the subsequent removal of the card 464. When a pushbutton 468 is depressed, in the direction of arrow 466, the ejection mechanism is released to push an adjacent card 464 partially outward, in the direction opposite arrow 466, thereby facilitating manual removal of the card. The terminal pins within socket 460 are electrically connected to a circuit card 458 by means of a flexible circuit cable 470 and connector 472. Circuit card 458 may be, for example, the system planar board 36 or an option card 62 (shown in FIG. 3).

Cards configured to fit into a PCMCIA-type socket 460 are generally available, containing random-access memory, read-only memory with a stored program, or I/O adapter logic. Cards having random-access memory can be used to expand system memory, while cards having read-only memory can be used as a source of external programs, in place of diskettes. Cards with I/O adapter logic may have cables to peripheral devices extending from or otherwise connected to their outward extending edges 476.

Referring to FIG. 30, alternate or additional means for mounting a PCMCIA-type socket 460 to removably accept cards 464 may be provided by attaching a socket frame 478 within the right front corner of frame 14. An access door 480 is provided in lower front bezel to permit access to removable cards 464 and to card ejection pushbuttons 468. This access occurs under an overextending bracket assembly 95 holding speaker 95a and switches and indicators 95b. A flexible cable 484 extends under cooling fan 34 for connection to planar board 36 by means of a connector 486. As described above in reference to FIG. 3, cooling fan 34 is mounted in a position spaced above an adjacent inner surface 52 of frame 14, providing a space suitable for cable routing.

An alternative linkage 490 for supporting top cover 12 in a raised position will now be discussed, with particular reference being made to FIGS. 31 and 32. This linkage 490 is an alternative to the linkage 110 previously discussed in reference to FIGS. 7 and 8. FIG. 31 is a partial elevational view showing the alternative linkage 490 extending between frame 14 and top cover 12, with top cover 12 in an open position for servicing or reconfiguring system 10. FIG. 32 is an exploded isometric view of a friction brake and detent mechanism 492 used to stabilize the linkage 110 with top cover 12 in its open position.

Referring to FIG. 31, an alternative linkage 490, fastened at each side between frame 14 and top cover 12 includes a lower link 494 and an upper link 496, pivotally joined through a friction brake and detent mechanism 492. A lower tab 498 of lower link 494 is displaced outward for pivotal attachment to a pin 499 extending inward from a sidewall 500 of frame 14. Upper link 496 is pivotally attached to upper cover 12 by a hollow pin 115, which has been discussed in reference to FIG. 26. Pivoting bail 27 is pivotally attached to frame 14 and to top cover 12, being used as previously described with reference to FIGS. 2, 7, and 8.

As top cover 12 is pivoted downward, the pivotal connection at friction brake 492 is moved in the direction of arrow 120. In this way, linkage 490 is folded forward to allow the free flow of cooling air through slots 46 in upper cover 12. A notch 508 in upper cover 12 allows this cover 12 to be pivoted downward over the outward spaced tab portion 498 of lower link 494 at each side of frame 14. This notch 508 does not extend upward into the portion of top cover 12 which is externally visible when top cover 12 is closed.

Referring to FIG. 32, lower link 494 and upper link 496 are pivotally attached by means of a pivot screw 510, which includes a hexagonal shoulder 512, a round shoulder 514, and a threaded portion 516. When these items are assembled, hexagonal shoulder 512 engages upper link 496 by means of a hexagonal aperture 518, while also engaging a bellville spring washer 520 and a detent plate 522 by extending through central hexagonal apertures 524 and 526, respectively. Round shoulder 514 of pivot screw 510 extends through hole 528 in thrust plate 530, through hole 532 in lower arm 494, and through hole 534 in thrust washer 536. Threaded portion 516 of pivot screw 510 engages a nut 538.

Thus, the opening or closing of top cover 12 (shown in FIG. 31) results in the rotational motion of upper link 496 relative to lower link 494. Bellville spring washer 520 and detent plate 522 are constrained by hexagonal shoulder 512 to turn with upper link 496. Thrust plate 530 is held against a thrust surface 540 of lower link 494, being constrained from rotation by a pair of tabs 542 held in slots 544 extending outward from thrust surface 540. As nut 538 is fastened onto threaded portion 516 of pivot pin 510, the compression of bellville spring washer 520 holds detent plate 522 against thrust plate 530, with contact being made particularly between a pair of dimples 546 in detent plate 522, directed toward thrust plate 530. When top cover 12 (shown in FIG. 31) is in its fully open position, each dimple 546 extends into a corresponding detent hole 548 in thrust plate 530, providing a tendency to hold top cover 12 fully open.

As top cover 12 is opened or closed, relative rotation occurs at a first interface between detent plate 522 and thrust plate 530 and at a second interface between nut 538 and lower link 494. Detent plate 522 and thrust plate 530 are preferably composed of hardened steel, while thrust washer 536 is preferably composed of a plastic resin having lubricity, such as an acetal material. A number of widely known techniques for locking nut 538 in place on threaded portion 516 may be employed to prevent the loosening of nut 538 with the opening and closing of linkage 490. Such techniques include the adhesive fastening of nut 538 to threaded portion 514 and the provision of an elastomeric insert within the threads of nut 538 or within threaded portion 516.

A motion limiting surface 550 of lower link 494 and a similar motion limiting surface 552 of upper link 496 are offset to contact one another when top cover 12 is fully opened, preventing further relative rotation of links 494 and 496. This position is held by means of the detent function provided by dimples 546 extending into adjacent holes 548. Various parameters, such as the force provided by the compression of bellville spring washer 520, the shape of dimples 546, and the angle to which links 494 and 496 are allowed to open before contact occurs between motion limiting surfaces 550 and 552, may be adjusted to provide either a mechanism allowing the closure of top cover 12 applying pressure to top cover 12, or alternately a mechanism preventing the closing of top cover 12 until a force is applied to linkage 492 in the direction of arrow 120.

FIG. 33 is a fragmentary isometric view of an alternative mechanism for attaching planar board 36 to frame 14, thereby providing an alternative to the mechanism previously described in relation to FIGS. 11 through 13. Thus, alternate means for engaging a mounting screw 188, used in the attachment of a planar board 36 to frame 14, include a formed nut 560, a formed spacer 562, and an attachment plate 564. Spacer 562 includes a flange 566 and a tapered hexagonal upstanding portion 568. Similarly, nut 560 includes a flange 566 and a tapered hexagonal upstanding portion 572, which fits inside upstanding portion 568 of spacer 562 to provide a threaded surface 573 for engaging screw 188. Attachment plate 564 includes a hexagonal aperture 574 at each location where nut 560 may be placed for fastening a planar board in place. Hexagonal aperture 574 is used both for locating nut 560 and for preventing its rotation when screw 188 is subsequently tightened to fasten planar board 36 in place. Spacer 562 also includes a number of lanced tabs 578, which snap into corresponding slots 580 of nut 560 to hold these parts together when they are assembled at a location defined by an aperture 574.

The process of attaching planar board 36 to frame 14 begins with the assembly of a number of spacers 562 to nuts 560 extending through hexagonal apertures 574 in positions corresponding to locations of mounting holes in planar board 36. In the manner previously described in reference to FIG. 11, attachment plate 564 may include several patterns of apertures 574 for attaching several different planar boards. The assembly thus formed is attached to frame 14 by means of a number of screws 582 engaging standoffs 584 extending upward from frame 14. Planar board 36 is then installed, with various screws 188 engaging various nuts 560. The configuration of nuts 560 and spacers 562 may subsequently be changed, if necessary, by removing plate 564 from frame 14, and by moving the nuts and spacers around as required. This method may be used, for example, to facilitate upgrading computer 10 by installing another kind of planar board.

The preceding discussion has been directed to particular examples of the present invention using the ISA bus as an interface to cards, such as option cards 62 (shown in FIG. 3) or short option cards 94 (shown in FIG. 5). Thus, the connectors 63 on riser card 64 (shown in FIG. 4) are of a type compatible with cards configured according to standards for the ISA bus interface. Similarly, slotted bracket 71 provides a mechanical interface compatible with the attachment of the cards configured according to standards associated with the use of the ISA bus. In turn brackets 72 (shown in FIG. 3), and the specialized brackets 450 and 462 (both shown in FIG. 29) provide a mechanical interface compatible with bracket 72, and also with mounting means provided in various other systems using the ISA bus.

As shown in FIG. 34, concepts of the present invention can be applied with equal facility, for example, to a system configured to use the IBM "MicroChannel" bus (a registered trademark of International Business Machines Corporation). In this example, a riser card 594 includes a number of connectors 596 configured for the attachment of standard option cards 598 using the MicroChannel bus. These connectors 596 are different from the previously described connectors 63 in a number of ways, including the use of a 0.050-inch contact spacing in place of the 0.100-inch contact spacing of connectors 63. A different planar board 600, providing signals for the MicroChannel bus at an interface connector 602, into which riser card 594 is plugged, is also used in this example.

Option card 598 includes provisions for electrical grounding which are typically used in systems with the Micro-Channel bus. A slotted mounting structure 604 is provided at the back of the computer system, with features for providing a grounding and mounting interface for standard cards, such as option card 598. This mounting structure 604 is preferably a die cast metallic structure, which may be mounted in the computer in place of slotted bracket 71, having similar means for attachment within the framework of the computer. Since mounting structure 604 is used to provide electrical grounding for option cards 598, suitably grounding is preferably provided for structure 604 through the framework of the computer, or through additional grounding means.

A flexible grounding bracket 606 is attached as a part of the assembly of card 598 using rivets 608. Card assembly 598 is installed by sliding in the direction of arrow 610, with grounding bracket 606 sliding into an elongated slot 612 of mounting structure 604. As this occurs, a pair of tabs 614 of grounding bracket 606 slide into slots 615 of mounting structure 604, and with a number of cantilever spring portions 616 of flexible grounding bracket 606 effecting electrical grounding by contacting mating surfaces 618 extending along each side of elongated slot 612. Slotted end 620 of grounding bracket 614 slides along an outer surface (not shown, but opposite inner surface 621) of mounting structure 604, with slot 622 passing over a threaded stud 624, extending outward in the direction of arrow 626. Additional electrical grounding is provided by contact between flexible tab 628 of grounding bracket 606 and an adjacent inner surface 630 of mounting structure 604. Contact tab 632 of card 598 is simultaneously inserted into the slots 634 of a connector 596, with conductive pads (not shown) on contact tab 632 making electrical contact with spring contacts (not shown) within connector 596. Card assembly 598 is subsequently held in place by tightening a nut 636 on the stud 624, clamping slotted end 620 of grounding bracket 606 in place. Nut 636 is preferably of a captive type, which cannot be removed from stud 624, and which, having a knurled surface, can be tightened by hand.

As also shown in FIG. 34, a socket 460, built in accordance with PCMCIA standards as previously discussed in reference to FIG. 29, is provided with alternate means for attachment in a structure, such as mounting structure 604, configured to accept option cards for attachment to the MicroChannel bus. Thus, socket mounting bracket 638 is formed to include a slotted tab portion 640 and a pair of mounting tabs 642. A flexible grounding bracket 644, attached to socket mounting bracket 638 by means of rivets 646, includes features of grounding bracket 606, such as cantilever spring portions 616 and a flexible tab 628.

When the socket assembly thus formed is installed in a slot 612 by sliding in the direction of arrow 610, electrical grounding is effected as described above, through contact between cantilever spring portions 616 and flexible tab 62 of grounding bracket 644. Socket assembly 630 is subsequently held in place, and a ground connection capable of carrying high currents is established with slotted tab portion 640, by tightening a nut 636 on a threaded stud 624.

As further shown in FIG. 34, riser card 394 includes an electrical interface for a PCMCIA-type socket at a connector 650, to which socket 460 is attached by means of a mating connector 652 and a flexible cable 654.

The application of various aspects of the present invention to a personal computer having additional capabilities achieved through the use of an enlarged top cover will now be discussed in reference to FIGS. 35 through 37. FIG. 35 is an isometric view of this expanded personal computer 660 with the enlarged top cover 662 in an open position. FIG. 36 is a partial right cross-sectional elevation of computer 660, with top cover 662 in a closed position, taken along section lines XXXVI—XXXVI in FIG. 35, in the manner of previously-discussed FIG. 16, showing particularly the arrangement of access doors and of the space adjacent to these doors. FIG. 37 is a partial cross-sectional elevation showing a sliding link 690 used in locking media access door 26, taken along section lines XXXVII—XXXVII in FIG. 35.

Referring first to FIG. 35, an enlarged top cover 662 may be installed in place of top cover 12 (shown, for example, in FIG. 6). Specifically, the sides 664 of the top cover enclosure 665 and the upper bezel 668 of top cover 662 are extended downward to provide space under DASD devices 88 and 93, which are attached to the top cover 662 by means previously described in reference to FIGS. 9 and 10. The media access door 26 of previous configurations fits into an opening in the upper portion of front bezel 668, and two intermediate access doors 670 are pivotally mounted in openings below door 26. This enlarged cover 662 is mounted to the frame unit 14 of previously discussed versions of the computer. Frame 14 includes a front bezel 100 having a pair of pivotable doors 100a and 100b. The same means for pivotable attachment, consisting of travel limiting linkages 110 and of pivoting bail 27, which have been described in reference to FIGS. 7 and 8, are used. Since the attachment positions of pivoting bail 27 remain in the location previously described for computer 10, despite the larger top cover 662, a rear panel 672 is added to the metal enclosure 665 of top cover 662. Previously described means are used for the releasable attachment of linkages 110 and of pivoting bail 27. A pair of hinge couplings 104, which are described above in reference to FIGS. 24 and 25, are attached to rear panel 672. Linkages 110 are attached to enlarged top cover 662 by means of snapfit couplings 115 as previously described in reference to FIG. 26.

The benefits of this approach are best seen by comparing FIGS. 16 and 36, which are, respectively, right side cross-sectional elevations of computer 10 (shown in FIG. 3), with the conventional top cover 12, and of computer 660 (shown in FIG. 35), with an enlarged top cover 662. In computer 660, additional space is provided below shield 674, which is similar to shield 252, except for a downward-extending portion 676, which engages the upper edge portion 268 of metal enclosure 265 of frame 14. Thus, shield 674 provides a place for storing media access door 26 in an open, horizontal position, as indicated at dashed lines 230, and as previously described in reference to FIG. 16. In computer 10, the space between transverse duct 38 and shield 252 is limited so that "H"-shaped central support structure 97 has room for only a single slot 98a on each side of central support member 99 (also shown in FIG. 6). On the other hand, in computer 660, there is enough distance between transverse duct 38 and shield 674 to allow space for both an upper slot 678 and a lower slot 680 on each side of central support member 681 of enlarged "H"-shaped central support structure 684. Downward-extending portion 676 includes a slot 685 to provide access to each upper slot 678.

Referring again to FIG. 35, these slots 678 and 680 in front slotted bracket 682 of central support structure 684 may be used for mounting the card bracket 72 of a short option card 94 or for mounting the a specialized mounting bracket configuration, such as one of the configurations discussed above in reference to FIG. 29. For example, socket mounting bracket 462 can be used to mount a PCMCIA-type socket 460, with a cable 470 extending to a be connected to a riser card (not shown) within central support structure 684.

In both the enlarged version of FIG. 35 and the smaller version of FIG. 6, this type of mounting for socket 460 is feasible and particularly desirable, since the cards 464 inserted into the socket 460 and the associated card ejection buttons 468 are accessable from the front of the computer with the appropriate doors open. Thus, these advantages are achieved either by attaching socket mounting bracket 462 to front slotted bracket 682 of computer 660 or to front slotted bracket 98a of computer 10 (shown in FIG. 6).

Referring again to FIG. 36, lower slots 680 are accessed through lower doors 100a and 100b, while upper slots 678 are accessed through intermediate doors 670. These doors 670 are mounted to rotate between a closed (vertical) position and an open (horizontal) position, as indicated at position 686 by dashed lines, in the manner of lower doors 100a and 100b, as previously described in reference to FIGS. 16, 17, and 20. A second lever actuator 284 (shown in FIG. 35), between these doors 670 in top cover 662 is added to provide means for manually opening and closing doors 670.

A separate locking mechanism is not needed for intermediate doors 670. As these doors are pivoted open, their lower edges traverse a curved path 688 as indicated by a dashed line, contacting the upper edges of doors 100a and 100b if these doors 100a and 100b are closed. Thus, doors 100a and 100b must be opened before doors 670 can be opened. In this way, the use of lock 28 to determine whether doors 100a and 100b can be opened is extended to provide a similar determination relative to doors 670.

The use of a cam 328 rotated by a lock 28 to move a locking bracket 340 has been discussed in reference to FIG. 23. Since the same frame unit 14 is used in computer 660, the multi-function locking mechanism 299 is also available in computer 660. In computer 10, when locking bracket 344 is moved in the direction of arrow 348, access door 26 can be moved downward for opening. When locking bracket 344 is returned in the direction opposite arrow 348, the downward motion required to begin the process of opening the door is blocked.

Referring to FIG. 37, in computer 660 (shown in FIG. 35) a sliding link 690 is added to prevent downward motion of door 26 from its position in cover bezel 668. This link 690, which is arranged to slide vertically in a track 692, includes a tab 694 extending under door 26 to block downward motion of the door and an inclined surface 696 engaging locking bracket 344. When locking bracket 344 is held in the direction opposite arrow 348, the downward motion of sliding link 690, resulting from an attempt to open door 26, is prevented by contact between inclined surface 696 and locking bracket 344. When locking bracket 344 is moved in the direction of arrow 348, this motion is allowed to occur. When locking bracket 344 is returned in the direction of arrow 348, the angle of inclined surface 696 returns sliding bracket 694 upward.

The preceding discussion has described a number of versions of the present invention having means for pivotally mounting a top cover along rear edges of the top cover and of the frame unit. However, as shown in FIGS. 38 and 39, the present invention may alternately be applied to a personal computer 700 in which a top cover 702 is pivotally mounted along an attachment side 704, extending from front to rear of a frame unit 706. FIG. 38 is a front elevational view of the computer 700 with its top cover 702 rotated upward into the position required for service and reconfiguration. FIG. 39 is a partial cross-sectional right side elevational view taken as indicated by section lines XXXIX—XXXIX in FIG. 38. In the example of FIG. 38, the right side of computer 700 is used as the attachment side 704. The following discussion describes the example of computer 700, with items having similar functions and characteristics as those previously described being accorded like reference numerals.

Referring first to FIG. 38, a top cover 702 is pivotally attached along an upper edge of attachment side 704 by means of a pair of "U"-shaped formed hinge rods 707 fastened to the side 704, for example, by welding. Top cover 702 is preferably mounted to pivot on hinge rods 707 by means of a pair of releasable hinge couplings 104, which have been described in detail referring to FIGS. 24 and 25. In this way, top cover 702 can be easily removed after it is opened. A travel-limiting linkage 110, which has been described in opening rotation of top cover 702. This linkage 110 of computer 700 is in an inverted relationship with the linkage 110 of computer 10, so that contact between tab 118 and stopping surface 121 prevents motion in the direction of arrow 708, away from the pivot axis determined by hinge rods 707, instead of in the direction of arrow 120 (as shown in FIG. 8) toward the pivot axis determined by upper rod portion 27 of pivot bail 27 in computer 10. Thus, as upper cover 702 is closed, linkage 110 folds toward the pivot corner, in the direction opposite arrow 708, instead of away from the-pivot corner, in the direction opposite arrow 120 (as shown in FIG. 8). In this way, an adjacent area 710, in which a DASD unit may be placed in engagement with a channel 86 of top cover 702, is not compromised by a need to accept the folding of linkage 110 as top cover 702 is closed. The offset of central pivot 116 from a line between upper pivot 115 and lower pivot 113 (shown in FIG. 8) is retained to provide a means for holding the top cover open (as described in reference to FIGS. 7 and 8). After top cover 702 is fully open, it is necessary to push the central portion of linkage 110 in the direction opposite arrow 708 to begin the process of closing top cover 702.

Continuing to refer to FIG. 38, various features of computer 10 are retained in computer 700. For example, a central support structure 79 includes a riser card 64, which is plugged into a planar board 36 at a planar board connector 65 (as shown in FIG. 4). Riser card 64 includes a number of attached connectors 63 into which option card assemblies 62 may be plugged. Central support structure 79 includes a slotted bracket 71, to which brackets 72 of card assemblies 62 are attached by means of screws 73. Top cover 702 includes a bracket 124, with slotted channels 86, internally attached by welding, to which DASD storage devices 88 and 93 may be in turn attached in the manner previously discussed in reference to FIGS. 9 and 10.

Referring to FIG. 39, like computer 10, computer 700 includes a media access door 26 which is manually movable between a vertical closed position and a horizontal open position indicated by dashed lines at position 230. However, in computer 700, the shield 712 forming a pocket for door 26 in its open position does not move upward with top cover 702 as this cover is opened. Metal enclosure 714 of frame unit 706 includes an upstanding portion 716 to which shield 712 is attached. Metal enclosure 718 of top cover 702 includes a downward extending portion 720, which engages a front lip 722 and a number of spring tab portions 724 of shield 712. Slotted tabs 232 of door 26 engage a downward formed lip portion 726 of cover enclosure 718 to hold door 26 in a closed position.

Referring to FIGS. 38 and 39, a rotary lock 28 with an attached cam 728 is used to provide the functions of locking top cover 702 and media access door 26 in closed positions. In the general manner previously discussed in reference to FIG. 23, as lock 28 is rotated with an inserted encoded key, a sliding bracket 730 is moved by a groove 732 between a forward position in which downward motion of door 26 is permitted to a rearward position in which such motion is permitted. Since shield 712 remains in place as top cover 702 is opened, a connecting link 734 is used to transmit the motion provided by a peripheral surface 736 of cam 728 between a cam follower 738 pivoted at a pin 740 and a cover latch 742 pivoted at a pin 744. Top cover 702 includes a latching bracket 748, which engages latching surface 750 of cover latch 742 when lock 28 is rotated to allow the motion of this latch 742 in the direction of arrow 752. Cam follower 738 is held against peripheral cam surface 736 by means of an extension spring 754.

An advantage of relative simplicity is achieved by employing the methods shown in FIGS. 38 and 39, in that a simple pivot along the upper edge of frame attachment side 704 is used in the attachment of top cover 702. That is, a bail pivotally mounted to both the frame and cover, as described in reference to FIGS. 2, 7, and 8, is not required. This simplicity is not simply due to pivoting the cover on the side instead of in the back; it is due to the fact that, in the computer of FIGS. 38 and 39, the central attachment structure 79 can be removed without moving the top cover with attached DASD devices away from the frame 706. However, even in this configuration, a pivotable bail of the type shown in FIGS. 2, 7, and 8 would possess some benefits in facilitating the removal of the power supply (not shown, but placed in the location of power supply 32 of FIG. 3). Also, it is understood that a rearrangement of internal components could result in a configuration having a top cover pivoted along the rear without a requirement for the cover to be moved away from the frame as it is opened.

While the invention has been described in its preferred forms or embodiments with some degree of particularity, it is understood that this description has been given only by way of example and that numerous changes in the details of construction, fabrication and use, including the combination and arrangement of parts, may be made without departing from the spirit and scope of the invention.

What is claimed is:

1. Personal computer apparatus comprising:

a frame with a generally flat bottom portion, an upstanding attachment side, and a rear frame opening, said frame being open above said bottom portion;

an essentially rectangular front frame bezel extending along a front edge of said bottom portion and along said upstanding attachment side, attached to said frame, wherein said attachment side of said frame extends rearward from said front frame bezel;

a planar board assembly fastened within said frame, by planar board attachment means, to said bottom portion, said planar board assembly including a riser connecter directed upward from said planar board assembly;

a central support structure for electrically connecting option card assemblies with said planar board assembly, said central support structure including a riser card engaging said riser connector, a plurality of card connectors on said riser card electrically connected through said riser card to said riser connector, and a rear attachment framework extending within said rear frame opening, wherein said rear attachment framework includes a plurality of rear slots extending therethrough and means for attaching a plurality of card assemblies of a first type in alignment with said rear slots and in engagement with various of said card connectors;

an "L"-shaped cover with a generally flat top portion and a cover side extending downward at a side of said top portion opposite said attachment side of said frame, said cover being open below said top portion;

a storage device attached to said top portion, extending below said top portion, by storage device attachment means; and cover attachment means attaching said top cover to said frame section to pivot about an axis extending along said attachment side of said frame, permitting pivotal movement of said top cover between a closed cover position, in which said central support structure is held in engagement with said riser connector, and an open cover position in which said central support structure can be disengaged from said riser connector, wherein said cover moves substantially through a ninety-degree angle between said closed cover position and said open cover position with said top portion of said cover extending horizontally in said closed cover position and vertically in said open cover position.

2. Apparatus as recited in claim 1, wherein said front frame bezel extends adjacently between said bottom portion of said frame and said top portion of said top cover.

3. The apparatus recited in claim 1, wherein said attachment side of said frame extends upward adjacent to said top portion of said cover, with said cover attachment means pivoting said cover adjacent said top portion thereof.

4. The apparatus recited in claim 1, comprising additionally a motion limiting linkage holding said cover in said cover open position.

5. The apparatus recited in claim 4, wherein said motion limiting linkage includes:

a lower link pivotally mounted on a lower pivot on said frame; and an upper link pivotally mounted at an upper pivot on said cover, said upper and lower links being pivotally attached at a central pivot; said central pivot moving in a linkage opening direction as said cover is moved between said closed cover position and said open cover position, said second position being offset in said linkage opening direction from a line through said lower and upper pivots when said cover is in said open cover position.

6. The apparatus of claim 1:

wherein said storage device uses removable media; and wherein said front frame bezel includes a media door movable between a closed door closed position extending adjacently in front of said storage device and an open door position in which said removable media can be removed and replaced. and wherein said apparatus comprises additionally a locking mechanism having a lock turned with an inserted, encoded key among a first lock position in which said cover is locked in said cover closed position and said media door is locked in said media door locked position, a second lock position in which said media door released to open and said cover is locked in said closed cover position, and a third lock position in which said cover and said media door are both released to open.

7. The apparatus of claim 6:

wherein said media door is moved downward to be unlatched from said door closed position; and wherein said lock mechanism includes first and second cams turned by said lock with said inserted, encoded key, with said first cam moving a latch to release said cover, and with said second cam moving a interposing link to allow downward movement of said media door.

8. Personal computer apparatus comprising:

a frame section with a generally flat bottom portion, a front frame bezel, and a rear frame opening, said frame section being open above said bottom portion;

a planar board assembly fastened within said frame section, by planar board attachment means, to said bottom portion, said planar board assembly including a riser connecter directed upward from said planar board assembly;

a central support structure for electrically connecting option card assemblies with said planar board assembly, said central support structure including a riser card engaging said riser connector, a plurality of card connectors on said riser card electrically connected through said riser card to said riser connector, and a rear attachment framework extending within said rear frame opening, wherein said rear attachment framework includes a plurality of rear slots extending therethrough and means for attaching a plurality of card assemblies of a first type in alignment with said rear slots and in engagement with various of said card connectors;

a top cover with a top portion, said top cover being open below said top portion;

a storage device attached to said top portion, extending below said top portion, by storage device attachment means;

cover attachment means attaching said top cover to said frame section along a cover attachment edge of said top cover and along a frame attachment of said frame section, permitting pivotal movement of said top cover between a closed cover position, in which said central support structure is held in engagement with said riser connector, and an open cover position in which said central support structure can be disengaged from said riser connector, a lower link pivotally mounted at a lower pivot on said frame section;

an upper link pivotally mounted at an upper pivot on said top cover, said upper and lower links being pivotally attached at a central pivot; and detent means at said central pivot resisting relative movement of said lower and upper links as said cover is moved from said open cover position toward said closed cover position, wherein said detent means includes first and second plates rotating relative to one another at said central pivot, with a protrusion in said first plate entering a recess in said second plate as said cover is moved into said open cover position.

9. Apparatus as recited in claim 8, wherein said detent means includes:

a detent surface of said upper link, disposed adjacent to said central pivot, said detent surface including a detent notch;

a detent plate mounted to slide along said central pivot and to pivot with said lower link, said detent plate including a curved surface extending into said detent notch when said top cover is in said open cover position; and a detent spring holding said detent plate in contact with said detent surface.

10. Personal computer apparatus comprising:

a frame section with a generally flat bottom portion, a front frame bezel, and a rear frame opening, said frame section being open above said bottom portion;

a planar board assembly fastened within said frame section, by planar board attachment means, to said bottom portion, said planar board assembly including a riser connecter directed upward from said planar board assembly;

a central support structure for electrically connecting option card assemblies with said planar board assembly, said central support structure including a deer card engaging said riser connector, a plurality of card connectors on said riser card electrically connected through said riser card to said riser connector, a front attachment framework having a plurality of front slots extending therethrough and means for attaching a plurality of card assemblies of a first type in alignment with said front slots and in engagement with various of said card connectors, and a rear attachment framework extending within said rear frame opening, wherein said rear attachment framework includes a plurality of rear slots extending therethrough and means for attaching a plurality of card assemblies of a first type in alignment with said rear slots and in engagement with various of said card connectors;

a top cover with a top portion, said top cover being open below said top portion;

a storage device attached to said top portion, extending below said top portion, by storage device attachment means; and cover attachment means attaching said top cover to said frame section along a cover attachment edge of said top cover and along a frame attachment edge of said frame section, permitting pivotal movement of said top cover between a closed cover position, in which said central support structure is held in engagement with said riser connector, and an open cover position in which said central support structure means includes a pivotable ball with an upper ball portion on which said cover attachment edge is pivotally mounted, and a lower bail portion pivotally mounted along said frame attachment edge for pivotal movement between an inward position, in which said top cover is in said closed cover position, and an outward position, in which said top cover is in said open cover position, first holding means for holding said top cover in said open cover position, and second holding means for holding said pivotable bail in said outward position.

11. Apparatus as recited in claim 10, comprising in addition an intermediate door in alignment with one of said front slots, movable between an intermediate door closed position and an intermediate door open position.

12. Apparatus as recited in claim 10, comprising in addition:

a socket assembly for removably receiving a circuit card of a second type, said socket assembly including a plurality of socket contacts for establishing electrical contact with a plurality of mating contacts along an end of said second type of circuit card inserted therein;

an ejection mechanism for facilitating removal of said second type of circuit card; and a bracket attaching said socket assembly and said ejection mechanism to said front attachment framework in alignment with one of said front slots for inserting and ejecting said circuit card of a second type therethrough.

13. Apparatus as recited in claim 12, including in addition:

processor means;

a system bus extending from said planar board through said riser connector and through traces in said riser card to said card connectors; and a second bus interface extending from said planar board through said riser card for direct connection to said socket assembly.

14. The apparatus of claim 10, comprising additionally:

a front cover section extending in front of said front attachment framework with a front access opening in alignment with said front slots; and a front door movable between a closed front door position in which access through said front access opening is prevented, and an open front door position in which access through said front access opening is permitted.

15. The apparatus of claim 14, comprising additionally:

a storage device with removable media; and a media door movable between a media door closed position in which the removal of said removable media is prevented and a media door open position in which said removable media can be removed.

16. The apparatus of claim 15:

wherein said top cover is movable between a top cover closed position preventing access for removal and replacement of said central support structure and said storage device, and a top cover open position allowing access for removal and replacement of said central support structure and said storage device; and wherein said apparatus comprises additionally locking means for preventing movement of said front door from said closed position to said front door open position, for preventing movement of said media door from said media door closed position to said media door open position, and for preventing movement of said top cover from said top cover closed position to said top door open position.

17. The apparatus of claim 16, wherein;

said locking means is movable with an encoded key inserted therein, between a first lock position, a second lock position adjacent said first lock position, a third lock position adjacent said second lock position, and a fourth lock position adjacent said third lock position;

said locking means includes means for preventing movement thereof between said lock positions when said encoded key is not inserted therein;

with said locking means in said first lock position, said front door cannot be moved from said front door closed position, said media door cannot be moved from said media door closed position to said media door open position, and said top cover cannot be moved from said top cover closed position to said top cover open position;

with said locking means in said second lock position, said front door cannot be moved from said front door closed position to said front door open position, said media door can be moved from said media door closed position to said media door open position, and said top cover cannot be moved from said top access cover closed position to said top cover open position;

with said locking means in said third lock position, said front door can be moved from said front door closed position to said front door open position, said media door can be moved from said media door closed position to said media door open position and said top cover cannot be moved from said top cover closed position to said top cover open position; and with said locking means in said fourth lock position, said front door can be moved from said front door closed position to said front door open position, said media door can be moved from said media door closed position to said media door open position, and said top cover can be moved from said top cover closed position to said top cover open position.

18. The apparatus of claim 17, wherein:

said top cover is mounted to pivot upward from said frame structure; and said storage device is mounted to an underside of said top cover above said central support structure.

19. Personal computer apparatus comprising:

a frame section with a generally flat bottom portion, a front frame bezel, and a rear frame opening, said frame section being open above said bottom portion;

a planar board assembly fastened within said frame section, by planar board attachment means, to said bottom portion, said planar board assembly including a riser connecter directed upward from said planar board assembly;

a central support structure for electrically connecting option card assemblies with said planar board assembly, said central support structure including a riser card engaging said riser connector, a plurality of card connectors on said riser card electrically connected through said riser card to said riser connector, and a rear attachment framework extending within said rear frame opening, wherein said rear attachment framework includes a plurality of rear slots extending therethrough and means for attaching a plurality of card assemblies of a first type in alignment with said rear slots and in engagement with various of said card connectors;

a top cover with a top portion, said top cover being open below said top portion;

a storage device attached to said top portion, extending below said top portion, by storage device attachment means;

cover attachment means attaching said top cover to said frame section along a cover attachment edge of said top cover and along a frame attachment of said frame section, permitting pivotal movement of said top cover between a closed cover position, in which said central support structure is held in engagement with said riser connector, and an open cover position in which said central support structure can be disengaged from said riser connector;

a socket assembly for removably receiving a circuit card of a second type, said socket assembly including a plurality of socket contacts for establishing electrical contact with a plurality of mating contacts along an end of said second type of circuit card inserted therein;

an ejection mechanism for facilitating removal of said second type of circuit card; and a bracket attaching said socket assembly and said ejection mechanism to said rear attachment framework in alignment with one of said rear slots for inserting and ejecting said circuit card of a second type therethrough.

20. Electronic apparatus comprising:

a frame unit with a generally flat lower side, an open upper side, and a bracket aperture in a first side;

a cover unit with an upper side an open lower side, attached to said frame unit to move between a cover closed position, in which internal apparatus is enclosed by said cover unit together with said frame unit, and a cover open position, in which said internal apparatus is outwardly exposed;

a central support assembly including a central support structure with a first slotted bracket extending within said bracket aperture, said first slotted bracket including a plurality of card assembly attachment slots extending therethrough, said first slotted bracket additionally including card attachment means in alignment with said card attachment slots, said central support structure additionally including a riser card with a plurality of circuit card connectors, electrically connected with a central attachment connector, various of said circuit card connectors being individually aligned with various of said card assembly attachment slots, said central support assembly additionally including a first type of circuit card assembly plugged into one of said circuit card connectors, said circuit card assembly including a port connector extending outward through one of said card attachment slots, said central support assembly additionally including a second slotted bracket, extending at an end of said central support assembly opposite said first slotted bracket, and a socket assembly for removably receiving a second type of circuit card through a slot in said second slotted bracket, together with an ejection mechanism for facilitating removal of said second type of circuit card from said socket, said socket assembly including a plurality of socket contacts for establishing electrical contact with a plurality of mating contacts along an end of said second type of circuit card inserted therein, wherein said central support assembly can be disconnected from said central attachment connector and removed therefrom with said cover unit in said open cover position, and wherein said central support structure is held in connection with said central attachment connector by proximity of said cover unit to said central support structure when said cover unit in said closed cover position; and a lockable access door covering said slot in said second slotted bracket.

21. Personal computer apparatus comprising:

a frame section with a generally flat bottom portion, a front frame bezel, and a rear frame opening, said frame section being open above said bottom portion;

a planar board assembly fastened within said frame section, by planar board attachment means, to said bottom portion, said planar board assembly including a riser connecter directed upward from said planar board assembly;

a central support structure for electrically connecting option card assemblies with said planar board assembly, said central support assembly including a riser card engaging said riser connector, a first plurality of card connectors on said riser card electrically connected through said riser card to said riser connector and a rear attachment framework extending at a rear end of said central support structure within a rear frame opening, wherein said rear attachment framework includes a plurality of rear slots extending therethrough and means for attaching a first plurality of card assemblies in alignment with said rear slots and in engagement with various card connectors within said first plurality thereof;

a top cover with a top portion, said top cover being open below said top portion;

a storage device attached to said top portion, extending below said top portion, by storage device attachment means;

cover attachment means attaching said top cover to said frame section along a cover attachment edge of said top cover and along a frame attachment of said frame section, permitting pivotal movement of said top cover between a closed cover position, in which said central support structure is held in engagement with said riser connector, and an open cover position in which said central support structure can be disengaged from said riser connector, a lower link pivotally mounted at a lower pivot on said frame section;

an upper link pivotally mounted at an upper pivot on said top cover, said upper and lower links being pivotally attached at a central pivot; and detent means at said central pivot resisting relative movement of said lower and upper links as said cover is moved from said open cover position toward said closed cover position, wherein said detent means includes first and second plates rotating relative to one another at said central pivot, with a protrusion in said first plate entering a recess in said second plate as said cover is moved into said open cover position.

22. Apparatus as recited in claim 21, additionally comprising:

a second plurality of card connectors on said riser card electrically connected through said riser card to said riser connector, a front attachment framework extending at a front end of said central support structure;

a front attachment bracket extending at a front end of said central attachment structure, wherein said front attachment bracket includes a plurality of front slots extending therethrough and means for attaching a second plurality of card assemblies in alignment with said front slots and in engagement with various card connectors within said second plurality thereof;

a front cover section extending in front of said front attachment bracket with a front access opening in alignment with said front slots;

a front door which is opened to provide access through said front access opening, wherein said front access door, when closed, prevents access through said front access opening;

a media door which is opened to remove removable media from said storage device, wherein said media door, when closed, prevents removal of said removable media;

locking means movable among a plurality of locking positions when an encoded key is inserted therein, said locking means being movable into a first locking position in which said top cover, said media door, and said front door are locked closed, a second locking position in which said media door may be opened while said top cover and said front door are locked closed, a third position in which said media door and said front door may be opened while said top cover is locked closed, and a fourth position in which said top cover, said media door, and said front door may be opened.

* * * * *